(12) United States Patent
Wang et al.

(10) Patent No.: US 8,526,347 B2
(45) Date of Patent: Sep. 3, 2013

(54) PEER-TO-PEER COMMUNICATION WITH SYMMETRIC WAVEFORM FOR DOWNLINK AND UPLINK

(75) Inventors: Renqiu Wang, San Diego, CA (US);
Ravi Palanki, San Diego, CA (US);
Naga Bhushan, San Diego, CA (US);
Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 13/154,645

(22) Filed: Jun. 7, 2011

(65) Prior Publication Data
US 2011/0305179 A1 Dec. 15, 2011

Related U.S. Application Data

(60) Provisional application No. 61/353,591, filed on Jun. 10, 2010, provisional application No. 61/356,504, filed on Jun. 18, 2010.

(51) Int. Cl.
*G08C 17/00* (2006.01)
*H04W 4/00* (2009.01)

(52) U.S. Cl.
USPC .......................................... 370/311; 370/329

(58) Field of Classification Search
USPC ................................................. 370/311, 329
See application file for complete search history.

(56) References Cited

U.S. PATENT DOCUMENTS

| | | | |
|---|---|---|---|
| 2003/0235209 A1* | 12/2003 | Garg et al. | 370/468 |
| 2008/0268855 A1* | 10/2008 | Hanuni et al. | 455/445 |
| 2009/0016285 A1 | 1/2009 | Li et al. | |
| 2009/0016353 A1 | 1/2009 | Li et al. | |
| 2009/0023460 A1* | 1/2009 | Cho et al. | 455/456.2 |
| 2010/0110999 A1 | 5/2010 | Li et al. | |
| 2010/0135273 A1* | 6/2010 | Kim | 370/344 |
| 2010/0136997 A1 | 6/2010 | Palanki et al. | |
| 2010/0165882 A1 | 7/2010 | Palanki et al. | |
| 2010/0322213 A1* | 12/2010 | Liu et al. | 370/338 |
| 2011/0161697 A1* | 6/2011 | Qi et al. | 713/320 |

FOREIGN PATENT DOCUMENTS

WO 2008036977 3/2008

OTHER PUBLICATIONS

International Search Report and Written Opinion—PCT/US2011/039853—ISA/EPO—Dec. 29, 2011.

\* cited by examiner

*Primary Examiner* — Ronald Abelson
(74) *Attorney, Agent, or Firm* — James K. O'Hare

(57) ABSTRACT

Techniques for supporting peer-to-peer (P2P) communication are disclosed. In an aspect, P2P communication may be supported with a symmetric waveform for a P2P downlink and a P2P uplink. In one design, a first UE generates a first signal based on a particular waveform (e.g., a downlink waveform or an uplink waveform for a wireless network) and transmits the first signal to a second UE for P2P communication. The first UE also receives a second signal generated by the second UE based on the particular waveform and transmitted to the first UE for P2P communication. In another aspect, a proximity detection signal may be transmitted in a portion of a subframe instead of the entire subframe. The remaining portion of the subframe may be used to transmit control information and/or other information to support P2P communication.

56 Claims, 12 Drawing Sheets

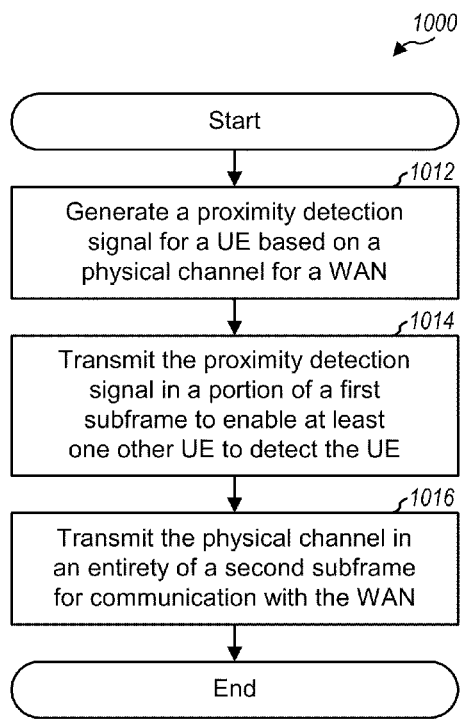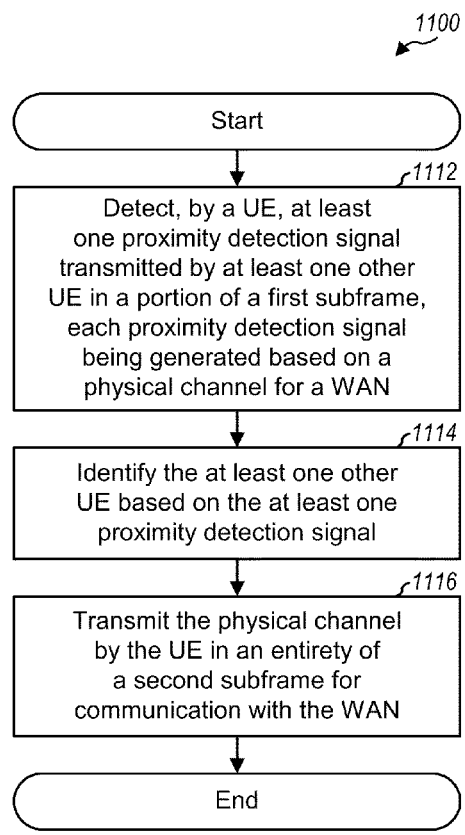
FIG. 10
FIG. 11

PEER-TO-PEER COMMUNICATION WITH SYMMETRIC WAVEFORM FOR DOWNLINK AND UPLINK

The present application claims priority to provisional U.S. Application Ser. No. 61/353,591, entitled "PEER-TO-PEER COMMUNICATION WITH SYMMETRIC WAVEFORM FOR DOWNLINK AND UPLINK," filed Jun. 10, 2010, and provisional U.S. Application Ser. No. 61/356,504, entitled "TRANSMISSION OF PEER DETECTION SIGNAL AND CONTROL INFORMATION FOR PEER-TO-PEER COMMUNICATION," filed Jun. 18, 2010, both incorporated herein by reference in their entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate peer-to-peer with one or more other UEs. It may be desirable to efficiently support P2P communication between UEs.

SUMMARY

Techniques for supporting P2P communication are described herein. In an aspect, P2P communication may be supported with a symmetric waveform for a P2P downlink and a P2P uplink between UEs communicating peer-to-peer. The waveform may be symmetric in that each UE may transmit signals and channels based on the same waveform for P2P communication. The use of the symmetric waveform for both the P2P downlink and P2P uplink may simplify the design of the UEs to support P2P communication.

In one design, a first UE may generate a first signal based on a particular waveform, which may be a downlink waveform or an uplink waveform for a WAN. The first UE may transmit the first signal to a second UE for P2P communication. The first UE may also receive a second signal transmitted by the second UE to the first UE for P2P communication. The second signal may be generated by the second UE based on the same waveform used for the first signal. The first UE may generate the first signal in different manners, e.g., depending on whether the first UE is acting as a P2P group owner or a P2P client. In one design, the first UE may determine information to send in at least one downlink signal or channel and may generate the first signal comprising the at least one downlink signal or channel carrying the information. In another design, the first UE may determine information to send in at least one uplink signal or channel and may map the at least one uplink signal or channel to at least one downlink signal or channel. The first UE may then generate the first signal comprising the at least one downlink signal or channel carrying the information.

In another aspect, a proximity detection signal may be transmitted in a portion of a subframe instead of the entire subframe. The remaining portion of the subframe may be used to transmit control information and/or other information to support P2P communication. This feature may improve performance and avoid delay for P2P communication, as described below In one design, a UE may detect at least one proximity detection signal transmitted by at least one other UE in a portion of a first subframe. Each proximity detection signal may be generated based on a physical channel (e.g., a PUSCH or a PUCCH) for a WAN. In one design, the at least one proximity detection signal may be transmitted in all symbol periods except for the last symbol period of the first subframe. The UE may identify the at least one other UE based on the at least one proximity detection signal and may communicate peer-to-peer with one or more of the at least one other UE. In one design, the UE (or some other UE) may send control information in the remaining portion of the first subframe for P2P communication. The UE may transmit the physical channel in an entirety of a second subframe for communication with the WAN.

In another design, a first UE may receive a data transmission from a second UE for P2P communication. The first UE may determine acknowledgement/negative acknowledgement (ACK/NACK) information for the received data transmission. The first UE may generate a signal comprising the ACK/NACK information based on a signal format that is not used for sending ACK/NACK information in a WAN. The first UE may transmit the signal comprising the ACK/NACK information to the second UE. The first UE may transmit the signal in a portion (e.g., the last symbol period) of a subframe, which is not used for transmitting proximity detection signals.

Various aspects and features of the disclosure are described in further detail below.

BRIEF DESCRIPTION OF THE DRAWINGS

FIG. 10 shows a process for transmitting a proximity detection signal.
FIG. 11 shows a process for detecting proximity detection signals.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
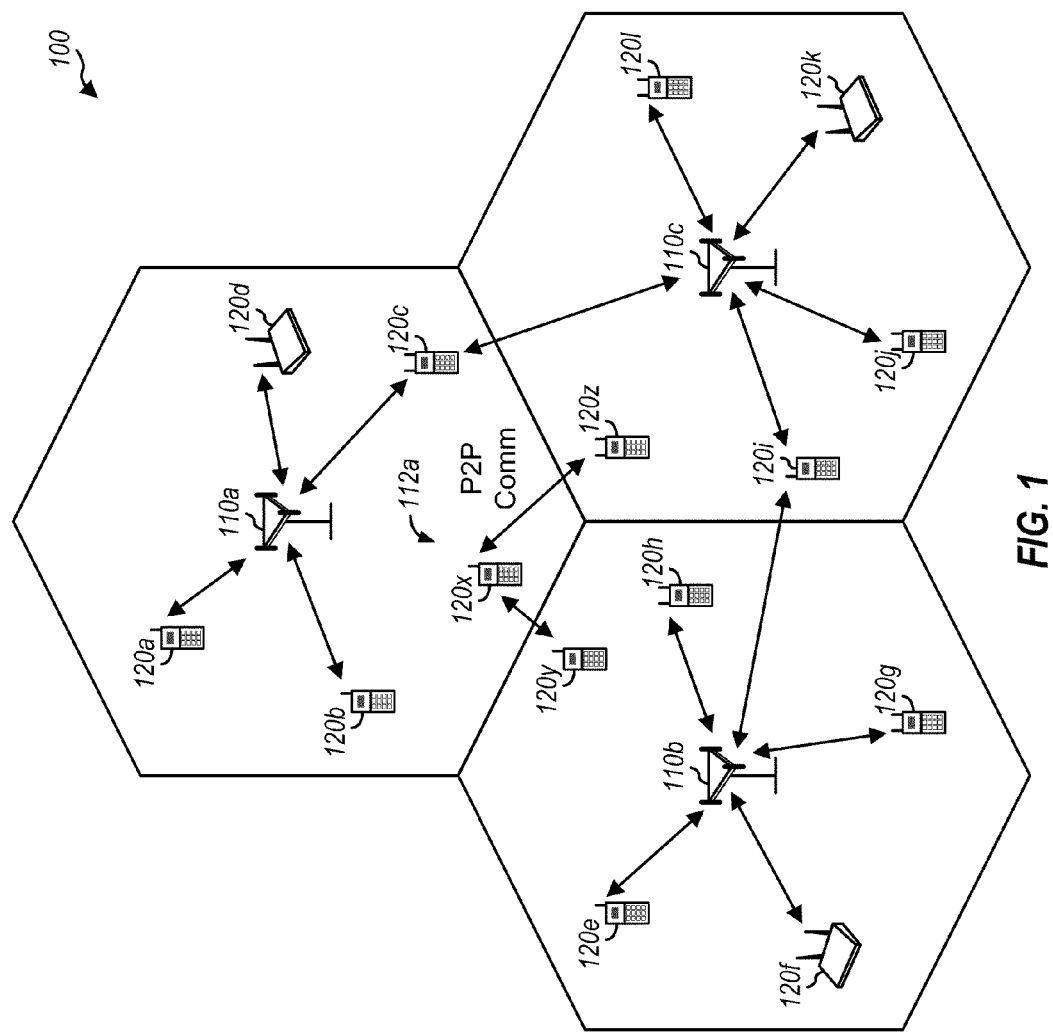
FIG. 1 shows a wireless communication network.

FIG. 1 shows a wireless communication network or WAN 100, which may be a LTE network or some other wireless network. Wireless network 100 may include a number of evolved Node Bs (eNBs) 110 and other network entities. An eNB may be an entity that communicates with the UEs and may also be referred to as a Node B, a base station, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area.

UEs 120 may be dispersed throughout the wireless network, and each UE may be stationary or mobile. A UE may also be referred to as a mobile station, a terminal, an access terminal, a subscriber unit, a station, a node, a device, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may communicate with an eNB in the wireless network. A UE may also communicate peer-to-peer with other UEs. In the example shown in FIG. 1, UEs 120x, 120y and 120z may communicate peer-to-peer, and the other UEs 120a through 120l may communicate with eNBs 110a through 110c. UEs 120x, 120y and 120z may also be capable of communicating with eNBs, e.g., when not engaged in P2P communication or possibly concurrent with P2P communication.

Figure 2:
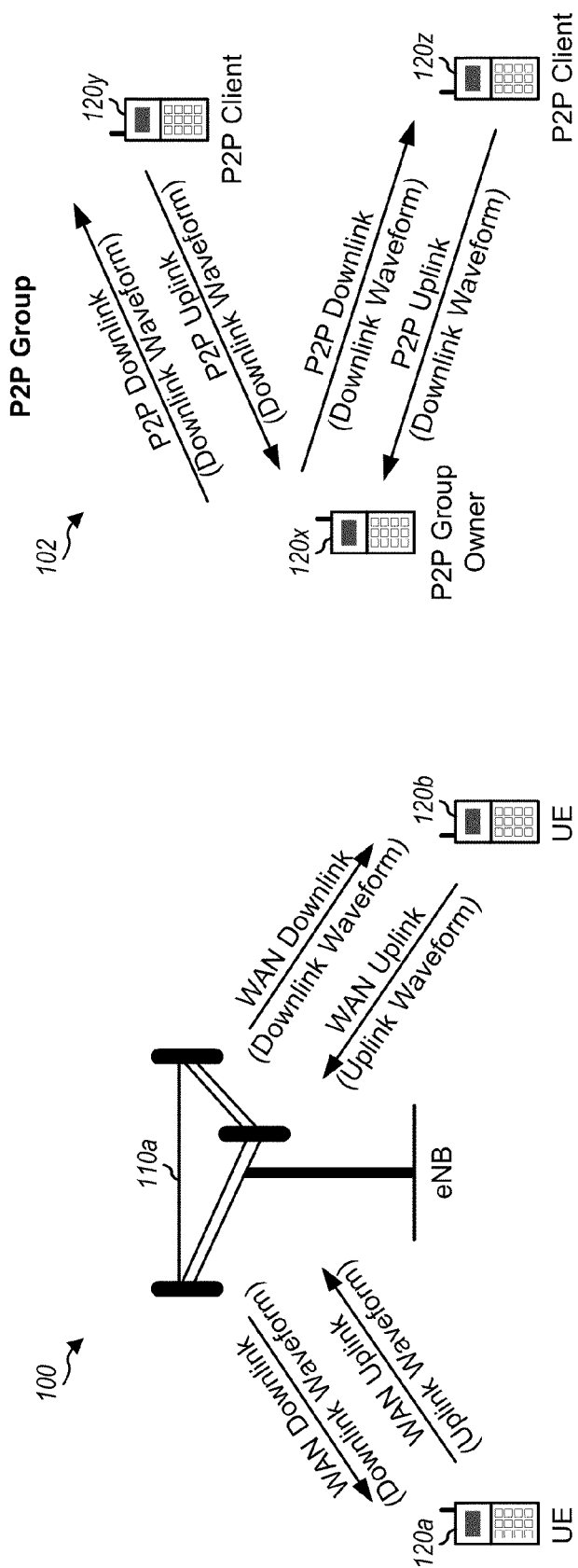
FIG. 2 shows WAN communication and P2P communication.

FIG. 2 shows WAN communication and P2P communication in wireless network 100. WAN communication refers to communication between a UE and an eNB, e.g., for a call with a remote entity such as another UE. A WAN UE is a UE that is interested or engaged in WAN communication. P2P communication refers to direct communication between two or more UEs, without going through an eNB. A P2P UE is a UE that is interested or engaged in P2P communication. A P2P group refers to a group of two or more UEs interested or engaged in P2P communication. For example, a P2P group 102 includes three UEs 120x, 120y and 120z engaged in P2P communication. A P2P link refers to a communication link for a P2P group.

In one design, all UEs in a P2P group may be symmetric and may perform similar functions (e.g., for Medium Access Control (MAC) layer and above). In another design, one UE in a P2P group (e.g., UE 120x in P2P group 102) may be designated as a P2P group owner (or a P2P server), and each remaining UE in the P2P group may be designated as a P2P client. The P2P group owner may perform certain management functions such as exchanging signaling with a WAN, performing resource negotiation with the WAN and/or other P2P groups, coordinating data transmission between the P2P group owner and the P2P client(s), etc. For example, the P2P group owner may perform functions normally performed by an eNB for MAC layer and above, and a P2P client may function in similar manner as a UE for MAC layer and above.

A UE may communicate with an eNB via the downlink and uplink. The UE may also communicate with another UE via the downlink and uplink. The downlink and uplink between the UE and the eNB may be referred to as WAN downlink and WAN uplink, respectively. The communication link from a P2P group owner to a P2P client may be referred to as P2P downlink. The communication link from the P2P client to the P2P group owner may be referred to as P2P uplink.

A downlink waveform may be defined for the WAN downlink, and an uplink waveform may be defined for the WAN uplink, as shown in FIG. 2. A waveform may be associated with a signal and channel structure and may include various signals and channels that may be used for a communication link on which the waveform is used. For example, the downlink waveform may include one or more synchronization signals to support cell detection and acquisition by UEs, one or more reference signals to support channel estimation and channel quality measurement, one or more downlink control channels for sending control information, one or more downlink shared channels for sending traffic data, etc. The uplink waveform may include one or more reference signals, one or more uplink control channels, one or more uplink shared channels, a random access channel, etc. A waveform may also specify various characteristics of each signal and channel in that waveform. For example, the downlink waveform may specify how often to send a synchronization signal, how to generate the synchronization signal, the resources to use to send the synchronization signal, etc. The downlink waveform is typically different from the uplink waveform. For WAN communication, a UE may be designed to receive signals and channels in the downlink waveform from an eNB and to transmit signals and channels in the uplink waveform to the eNB.

In an aspect, P2P communication may be supported with a symmetric waveform for the P2P downlink and P2P uplink. The waveform may be symmetric in that each UE may transmit signals and channels based on the same waveform for P2P communication. In particular, for P2P communication between a first UE and a second UE, the first UE may generate signals and channels based on the waveform and may transmit the signals and channels on the P2P downlink to the second UE. The second UE may also generate signals and channels based on the same waveform and may transmit the signals and channels on the P2P uplink to the first UE. The waveform may include a set of signals and channels. The first UE may transmit some or all of the signals and channels in the waveform to the second UE. The second UE may also transmit some or all of the signals and channels in the waveform to the first UE. The first and second UEs may transmit similar or different information in the signals and channels of the waveform. The use of a symmetric waveform for both the P2P downlink and P2P uplink may simplify the design of the UEs to support P2P communication.

In general, a symmetric waveform for P2P communication may be a downlink waveform or an uplink waveform for a WAN. For clarity, much of the description below is for a design of using a downlink waveform in LTE as the symmetric waveform for P2P communication.

Figure 3:
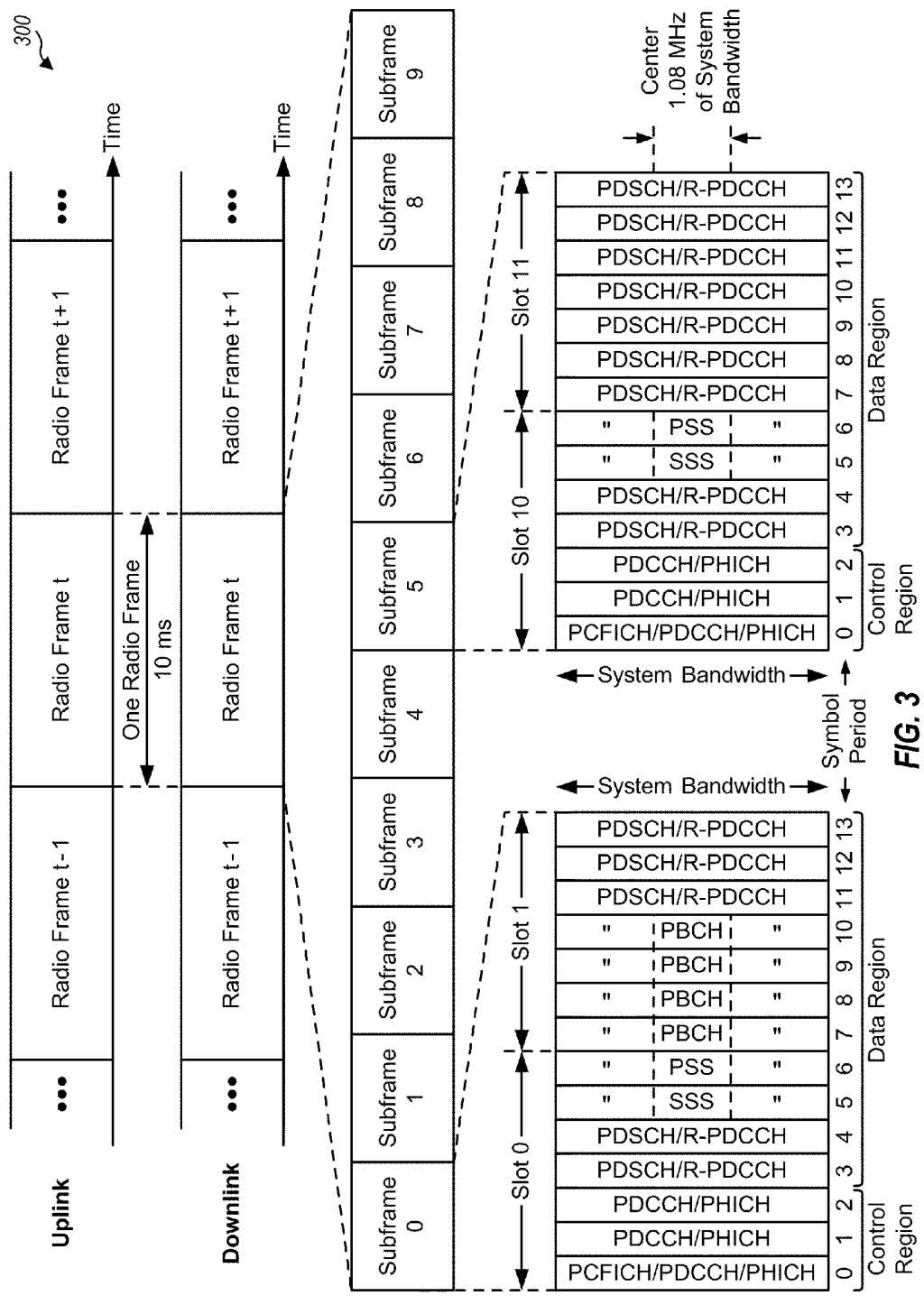
FIG. 3 shows an exemplary frame structure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.4, 3, 5, 10 or 20 megahertz (MHz), respectively. The system bandwidth may also be partitioned into subbands. Each subband may cover a range of frequency, e.g., 1.25 MHz. On the downlink, an OFDMA symbol may be transmitted in each symbol period of a subframe. On the uplink, a SC-FDMA symbol may be transmitted in each symbol period of a subframe.

Figure 4:
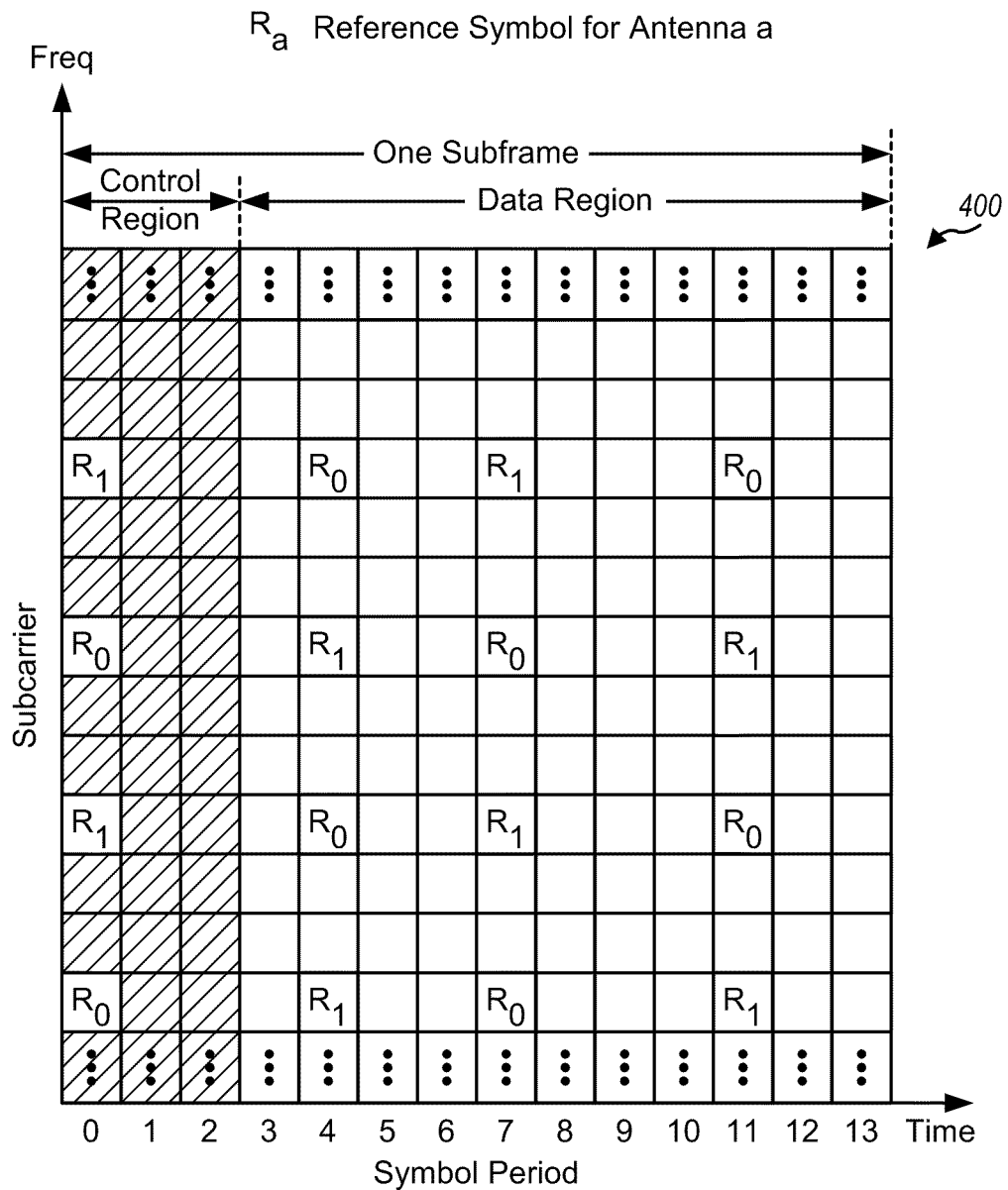
FIG. 4 shows an exemplary subframe format for the downlink.

FIG. 4 shows an exemplary subframe format 400 for the downlink in LTE with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

A subframe for the downlink may include a control region and a data region, which may be time division multiplexed. The control region may include the first Q symbol periods of the subframe, where Q may be equal to 1, 2, 3 or 4. Q may change from subframe to subframe and may be conveyed in the first symbol period of the subframe. The control region may carry control information. The data region may include the remaining 2L-Q symbol periods of the subframe and may carry data and/or other information for UEs.

Subframe format 400 may be used for an eNB equipped with two antennas. A cell-specific reference signal (CRS) may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. The CRS may be transmitted on evenly spaced subcarriers, which may be determined based on the cell ID. The CRSs for different cells may be transmitted on the same or different subcarriers, depending on their cell IDs. Resource elements not used for the CRS may be used to transmit data, control information, etc.

Figure 5:
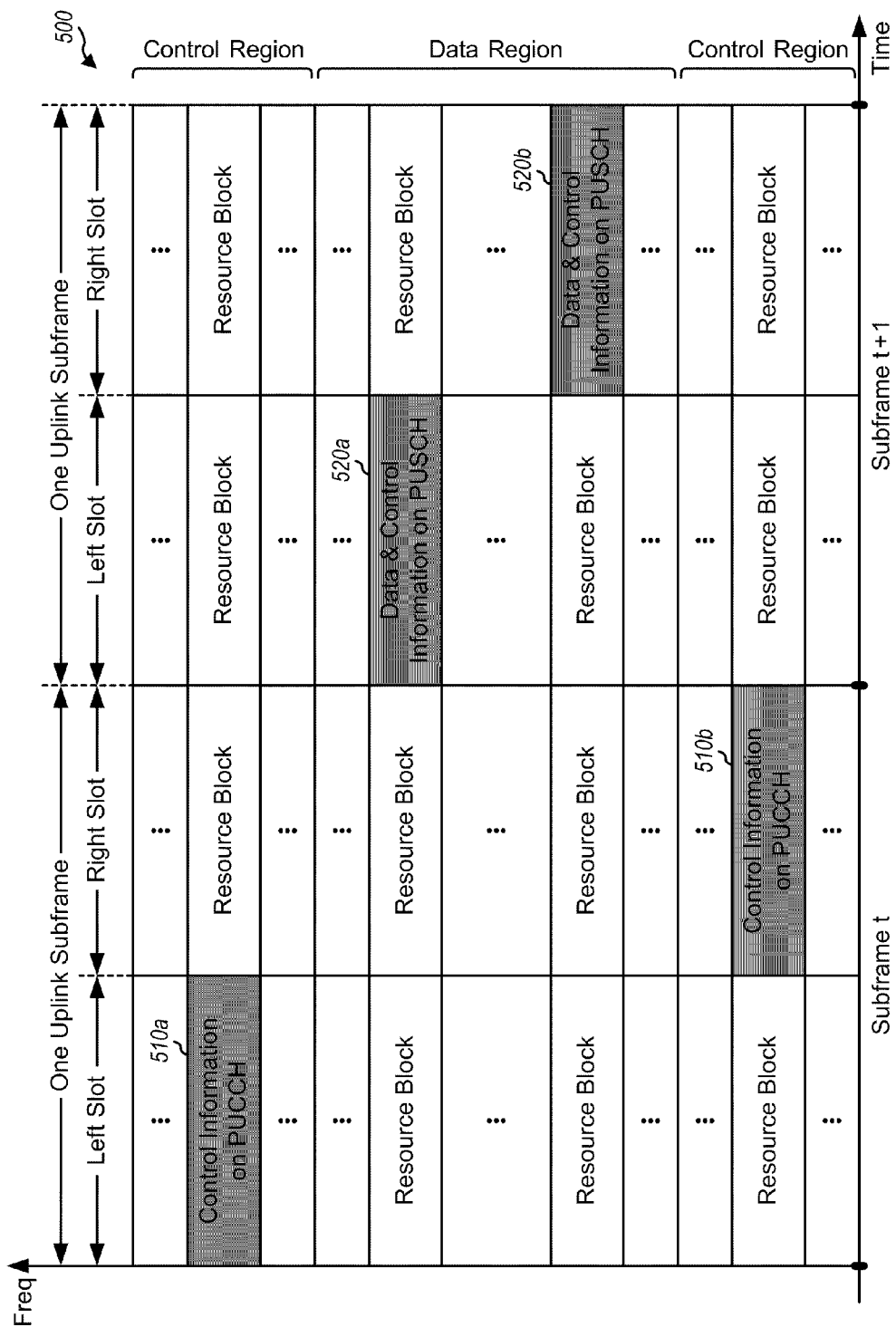
FIG. 5 shows an exemplary subframe format for the uplink.

FIG. 5 shows an exemplary subframe format 500 for the uplink in LTE. The available resource blocks for the uplink may be partitioned into a data region and a control region. The control region may be formed at the two edges of the system bandwidth (as shown in FIG. 5) and may have a configurable size. The data region may include all resource blocks not included in the control region. A UE may be assigned two resource blocks 510a and 510b (or possibly more than two resource blocks) in the control region in two slots of one subframe to send control information on a physical uplink control channel (PUCCH). The two resource blocks may occupy different sets of subcarriers when frequency hopping is enabled, as shown in FIG. 5. The UE may be assigned two resource blocks 520a and 520b (or possibly more than two resource blocks) in the data region in two slots of one subframe to send only data or both data and control information on a physical uplink shared channel (PUSCH).

LTE supports a set of signals and channels for the downlink (or downlink signals and channels) and a set of signals and channels for the uplink (or uplink signals and channels). Table 1 lists some downlink signals and channels supported by LTE.

TABLE 1

Downlink Signals and Channels in LTE

| Channel or Signal | Acronym | Description |
|---|---|---|
| Primary Synchronization Signal | PSS | Signal used by UEs for cell search and acquisition. |
| Secondary Synchronization Signal | SSS | Signal used by UEs for cell search and acquisition. |
| Physical Broadcast Channel | PBCH | Channel carrying some system information. |
| Physical Control Format Indicator Channel | PCFICH | Channel conveying the size of the control region in a subframe on the downlink. |
| Physical Hybrid ARQ Indicator Channel | PHICH | Channel carrying ACK/NACK information for data sent on the uplink with HARQ. |
| Physical Downlink Control Channel | PDCCH | Channel carrying downlink control information (DCI). |
| Relay Physical Downlink Control Channel | R-PDCCH | Channel carrying downlink control information. |

TABLE 1-continued

Downlink Signals and Channels in LTE

| Channel or Signal | Acronym | Description |
| --- | --- | --- |
| Physical Downlink Shared Channel | PDSCH | Channel carrying data for UEs scheduled for data transmission on the downlink. |
| Cell-specific Reference Signal | CRS | Reference signal for a cell. |
| UE-specific Reference Signal | UE-RS | Reference signal for a specific UE. |
| Channel State Information Reference Signal | CSI-RS | Reference signal for channel measurements by UEs. |

Table 2 lists some uplink signals and channels supported by LTE.

TABLE 2

Uplink Signals and Channels in LTE

| Channel or Signal | Acronym | Description |
| --- | --- | --- |
| Physical Random Access Channel | PRACH | Channel carrying random access preamble from a UE attempting to access a wireless network. |
| Physical Uplink Control Channel | PUCCH | Channel carrying uplink control information (UCI). |
| Physical Uplink Shared Channel | PUSCH | Channel carrying only data or both data and uplink control information. |
| Demodulation Reference Signal | DMRS | Reference signal sent on the PUCCH or PUSCH and used for coherent detection. |
| Sounding Reference Signal | SRS | Reference signal used by eNBs for channel quality measurement. |

LTE supports other signals and channels for the downlink and uplink, which are not shown in Tables 1 and 2 for simplicity. The various signals and channels for the downlink and uplink in LTE are described in 3GPP TS 36.211, entitled "Evolved Universal Terrestrial Radio Access (E-UTRA); Physical Channels and Modulation," which is publicly available.

An eNB may transmit various signals and channels in the downlink waveform to UEs to support WAN communication. For example, the eNB may transmit the signals and channels in Table 1 for WAN communication.

Referring to FIG. 3, the eNB may transmit the PSS and SSS in the center 1.08 MHz of the system bandwidth for each cell supported by the eNB. For FDD, the PSS and SSS may be transmitted in symbol periods 6 and 5, respectively, in subframes 0 and 5 of each radio frame with the normal cyclic prefix, as shown in FIG. 3. The PSS and SSS may be used by the UEs for cell search and acquisition. The eNB may transmit the CRS across the system bandwidth for each cell supported by the eNB. The CRS may be transmitted in certain symbol periods of each subframe (e.g., as shown in FIG. 4) and may be used by the UEs for channel estimation, channel quality measurement, and/or other functions. The eNB may transmit the PBCH in symbol periods 0 to 3 in slot 1 of certain radio frames. The PBCH may carry some system information.

The eNB may transmit the PCFICH, PDCCH and PHICH in the control region of a subframe. The PCFICH may be transmitted across the entire system bandwidth in the first symbol period of the subframe (as shown in FIG. 3) and may convey the size of the control region (or the value of Q). The PHICH may be transmitted across the entire system bandwidth and may carry ACK/NACK information for data transmission sent on the uplink with HARQ. The PDCCH may be transmitted in one or more control channel elements (CCEs), with each CCE including 36 resource elements. The PDCCH may carry downlink control information such as downlink grants, uplink grants, power control information, etc. The eNB may transmit the PDSCH in the data region of a subframe. The PDSCH may carry data for UEs scheduled for data transmission on the downlink. The eNB may also transmit the R-PDCCH in the data region of a subframe. The R-PDCCH may carry control information, similar to the PDCCH. However, the PDCCH may be transmitted across a wide frequency range (e.g., across the entire system bandwidth) in the control region whereas the R-PDCCH may be transmitted in a more narrow frequency range (e.g., in a specific subband) in the data region. The R-PDCCH for different cells may be frequency division multiplexed on different frequency ranges, e.g., on different subbands.

A UE may transmit various signals and channels in the uplink waveform to an eNB for WAN communication. For example, the UE may transmit the signals and channels in Table 2 for WAN communication. The SRS may be transmitted periodically (when and as configured) and may be used by the eNB for channel quality measurement. The DMRS may be transmitted on the PUCCH or PUSCH and may be used for channel estimation and data demodulation. The PUCCH may be transmitted on resource blocks in the control region of a subframe for the uplink and may carry uplink control information. The uplink control information may include channel quality indicator (CQI), precoding matrix indicator (PMI), rank indicator (RI), scheduling request (SR), ACK/NACK information, etc. CQI, PMI and/or RI may also be referred to as channel state information (CSI). The PUSCH may be transmitted on resource blocks in the data region of a subframe for the uplink and may carry only data or both data and control information. The control information may be transmitted (i) by itself on the PUCCH in the control region if data is not transmitted or (ii) with data on the PUSCH in the data region if data is transmitted. The control region and data region may be frequency division multiplexed on the uplink and may occupy different frequency ranges, as shown in FIG. 5.

In one design, a P2P group comprising two or more UEs may communicate peer-to-peer, and each UE may transmit signals and channels in the downlink waveform for P2P communication. In one design, one UE in the P2P group (e.g., a P2P group owner) may be designated to transmit signals and channels in the downlink waveform on the P2P downlink, e.g., in similar manner as an eNB. Another UE in the P2P group (e.g., a P2P client) may transmit the signals and channels in the downlink waveform on the P2P uplink. This UE may map signals and channels in the uplink waveform to signals and channels in the downlink waveform, as described below.

The use of the downlink waveform for both the P2P downlink and P2P uplink may simplify operation of all P2P UEs. A UE may normally include a receiver for the downlink waveform and a transmitter for the uplink waveform to support WAN communication. The UE may further include a transmitter for the downlink waveform to support P2P communication. The transmitter for the downlink waveform may be much simpler to implement than a receiver for the uplink waveform, which would be needed if the uplink waveform is used for P2P communication.

In one design, a P2P group owner may have partial eNB functionality and may generate signals and channels in the downlink waveform in similar manner as an eNB. A P2P client may operate in similar manner as a WAN UE. The P2P downlink may be similar to the downlink for WAN communication. However, for the P2P uplink, information normally sent in signals and channels in the uplink waveform may be mapped to signals and channel in the downlink waveform.

The signals and channels in the uplink waveform (or uplink signals and channels) may be mapped to the signals and channels in the downlink waveform (or downlink signals and channels) in various manners. For clarity, the description below assumes a P2P group including one P2P group owner and one P2P client. The mapping of uplink signals and channels to downlink signals and channels by the P2P client is described below.

In one design, the PRACH in the uplink waveform may be mapped to the PSS and/or SSS in the downlink waveform. In LTE, the PSS and SSS can convey a cell ID of a cell, which may be one of 504 possible cell IDs. The PSS and SSS can thus convey one of 504 possible values, and up to 504 possible PRACH values may be supported with the PSS and SSS. The information to send on the PRACH may be mapped to one of the possible PRACH values. The PSS and SSS may then be generated based on the value/information to send on the PRACH, in similar manner as for a cell ID. In particular, a spreading sequence may be generated for the PSS based on the PRACH value, and a pseudo-random number (PN) sequence may be generated for the SSS based on the PRACH value. The spreading sequence may be a Zadoff-Chu sequence, a computer-generated sequence, or some other sequence having good correlation properties. The PSS may then be generated based on the spreading sequence, and the SSS may be generated based on the PN sequence. The PSS and SSS carrying the PRACH value from the P2P client may be indistinguishable from the PSS and SSS carrying a cell ID from an eNB. The P2P group owner may detect the PSS and SSS from the P2P client in similar manner as a UE detecting the PSS and SSS from an eNB. However, the P2P group owner may detect for a set of possible PRACH values, which may be fewer than the set of 504 possible cell IDs.

In one design, the PUSCH in the uplink waveform may be mapped to the PDSCH in the downlink waveform. In LTE, the PUSCH may carry (i) only data when no control information is sent or (ii) both data and control information when control information is sent. Sending both data and control information on the PUSCH would (i) avoid the need to transmit both the PUSCH and PUCCH in the same subframe and (ii) maintain a single-carrier waveform for the uplink, which may be desirable. This single-carrier waveform restriction for the uplink waveform may be alleviated by the use of the downlink waveform for the P2P uplink. Hence, the P2P client may send data on the PDSCH and may send control information (if any) on one or more other downlink channels.

In one design, which may be referred to as Option A, the PUCCH in the uplink waveform may be mapped to the PDCCH and PHICH in the downlink waveform. The PUCCH may carry various types of uplink control information such as CQI, PMI, RI, SR, ACK/NACK, etc. In one design, ACK/NACK and SR may be sent on the PHICH (e.g., with different resources for the PHICH). CQI/PMI/RI may be sent on the PDCCH (e.g., in one CCE). CQI/PMI/RI may include only CQI, or only PMI, or only RI, or a combination thereof. The control information may also be mapped to the PDCCH and PHICH in other manners. In another design, the PUCCH may be mapped to only the PDCCH in the downlink waveform. For both designs, the P2P client may transmit the PCFICH to indicate the size (or the number of symbol periods Q) of the control region in which the PUCCH and possibly the PHICH are transmitted.

In another design, which may be referred to as Option B, the PUCCH may be mapped to the PDSCH. In one design, CQI/PMI/RI, ACK/NACK, and SR may be processed (e.g., encoded) separately and sent on different resources on the PDSCH. In another design, CQI/PMI/RI, ACK/NACK, and/or SR may be jointly encoded and sent on the same resources on the PDSCH. The same or different codes (e.g., repetition code, or tail biting convolutional code, etc.) may be used for CQI/PMI/RI, ACK/NACK, and SR. Furthermore, CQI/PMI/RI, ACK/NACK, and SR may be sent on the PDSCH using the same codes used for sending data on the PUSCH or some other codes. The PUCCH may also be mapped to the PDSCH in other manners. The P2P client may skip transmitting the PCFICH since the PDCCH would not be sent in this design, and the size of the control region may be zero. To reduce interference, the CRS may be transmitted only in resource blocks in which the PDSCH carrying the uplink control information is sent.

In yet another design, which may be referred to as Option C, the PUCCH may be mapped to the R-PDCCH in the downlink waveform. CQI/PMI/RI, ACK/NACK, and SR may be encoded separately or jointly and may be sent on different or the same resources on the R-PDCCH. The R-PDCCH may be transmitted in one or more subbands assigned to the P2P client. This may allow the R-PDCCH for multiple P2P clients to be frequency division multiplexed.

In one design, the DMRS in the uplink waveform may be mapped to the CRS in the downlink waveform. The P2P client may transmit the CRS in each subframe in which data and/or control information is transmitted on the P2P uplink. The CRS may be used for channel estimation and data demodulation by the P2P group owner. In one design, the P2P client may transmit the CRS in only the subband(s) in which data and/or control information is transmitted. In one design, the P2P client may transmit the CRS (i) in the control region only if control information is transmitted in the control region and (ii) in the data region only if data is transmitted in the data region. For example, the P2P client may transmit the CRS in the control region if the PDCCH and/or PHICH are transmitted and in the data region if the PDSCH or R-PDCCH is transmitted.

In one design, the SRS in the uplink waveform may be mapped to the CRS in the downlink waveform. The P2P client may be configured to transmit the CRS periodically (e.g., in similar manner as for the SRS) in order to allow the P2P group owner to periodically measure the channel quality of the P2P uplink. The P2P client may transmit the CRS as configured, even when no data or control information is transmitted. In one design, the P2P client may transmit the CRS in one or more designed subbands, which may be assigned to the P2P client for P2P communication. In another design, the P2P client may transmit the CRS across the system bandwidth.

Table 3 lists an exemplary mapping of signals and channels in the uplink waveform to signals and channels in the downlink waveform in LTE.

TABLE 3

| Uplink Waveform | Map to . . . | Downlink Waveform |
| --- | --- | --- |
| PRACH | → | PSS and SSS |
| PUSCH | → | PDSCH |
| PUCCH | → | PDCCH and PHICH; or PDSCH; or R-PDCCH |
| DMRS and SRS | → | CRS or UE-RS |

In general, the uplink signals and channels may be mapped to the downlink signals and channels in various manners. The mapping of the uplink signals and channels to the downlink signals and channels may be static and known by all UEs or may be configurable for a UE. Some downlink signals and/or channels may not be needed for the P2P uplink and may be omitted. For example, the P2P client may skip transmitting the PBCH in the downlink waveform.

The transmit power of the P2P client may be controlled to obtain good performance while reducing interference to other UEs. In one design, power control may be performed based on an overall power spectral density (PSD) of the P2P client. In another design, power control may be performed for individual signal or channel transmitted by the P2P client. Power control may also be performed in other manners.

The use of the downlink waveform for both the P2P downlink and P2P uplink may provide various advantages, such as:
  Reuse signals and channels in the downlink waveform, and
  Reduced complexity to support P2P communication with only partial eNB functionality and a downlink waveform transmitter.

Reduced complexity may be obtained because a UE can support WAN communication and P2P communication with (i) a transmitter for the downlink waveform to support P2P communication and (ii) a transmitter for the uplink waveform and a receiver for the downlink waveform to support WAN communication. The P2P group owner can receive the downlink waveform from the P2P client using the receiver for the downlink waveform, which is also used for WAN communication. The UEs can thus support P2P communication with only partial eNB functionality (e.g., for the transmitter for the downlink waveform) in addition to normal UE functionality.

The use of the downlink waveform for both the P2P downlink and P2P uplink may result in simpler implementation than a scheme that uses the downlink waveform for one P2P link (e.g., the P2P downlink) and the uplink waveform for the other P2P link (e.g., the P2P uplink). In this scheme, a UE may need to support full eNB functionality and may include both a transmitter for the downlink waveform and a receiver for the uplink waveform to support P2P communication. The UE would also include a transmitter for the uplink waveform and a receiver for the downlink waveform to support WAN communication. Hence, complexity of the UE may be significantly increased due to the need to support both eNB functionality and WAN UE functionality.

The downlink waveform may be used for both the P2P downlink and P2P uplink when a P2P group owner can be distinguish from a P2P client (e.g., in MAC layer and above), as discussed above. The downlink waveform may also be used for both the P2P downlink and P2P uplink when there is no differentiation of P2P group owners and P2P clients, e.g., when all P2P UEs are symmetric in MAC layer and above.

For clarity, the use of the downlink waveform for both the P2P downlink and P2P uplink has been described in detail above. In another design, the uplink waveform may be used for both the P2P downlink and P2P uplink. Using the uplink waveform may provide certain advantages. For example, it may be simpler to implements some P2P signals (e.g., proximity detection signals) based on signals and/or channels in the uplink waveform.

P2P communication and WAN communication may be supported in various manners. In one design, resource partitioning between P2P links and WAN links may be performed based on time division multiplexing (TDM). In this design, some subframes may be allocated for P2P communication, and the remaining subframes may be allocated for WAN communication. For example, eight time interlaces 0 through 7 may be defined, with each time interlace including subframes that are spaced apart by eight subframes. Two time interlaces may be allocated for P2P communication, and the remaining six time interlaces may be used for WAN communication. UEs may communicate peer-to-peer in the subframes allocated for P2P communication and may communicate with eNBs in the subframes allocated for WAN communication. This design may support concurrent P2P communication and WAN communication.

In one design, resource partitioning may be performed based on TDM and/or FDM to allocate resources to different P2P groups (inter-P2P groups) and to allocate resources to different UEs within the same P2P group (intra-P2P group). In one design, some of the available subframes may be allocated to a P2P group for P2P communication. The UEs in the P2P group may communicate peer-to-peer in the allocated subframes. In another design, a range of frequencies (e.g., a subband) may be allocated to a P2P group for P2P communication. In yet another design, some resource blocks may be allocated to a P2P group for P2P communication. In general, time and/or frequency resources may be allocated to a P2P group for P2P communication.

Figure 6:
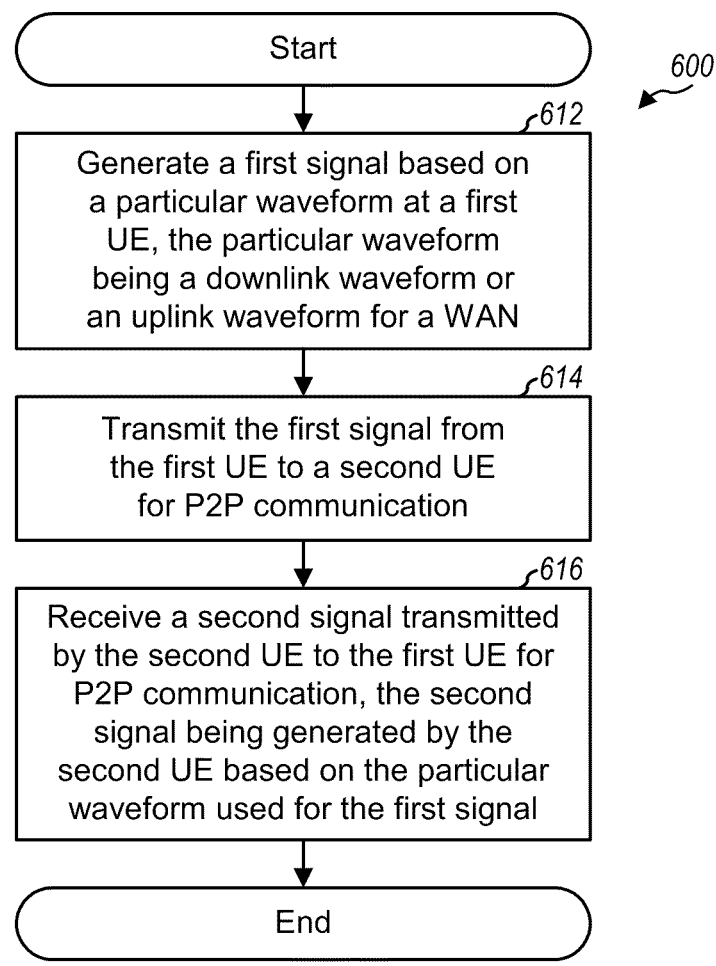
FIG. 6 shows a process for communicating peer-to-peer with a symmetric waveform.

FIG. 6 shows a design of a process 600 for communicating peer-to-peer. Process 600 may be performed by a first UE to communicate peer-to-peer with a second UE. The first UE may generate a first signal based on a particular waveform, which may be a downlink waveform or an uplink waveform for a WAN (block 612). The first UE may transmit the first signal to the second UE for P2P communication (block 614). The first UE may also receive a second signal transmitted by the second UE to the first UE for P2P communication (block 616). The second signal may be generated by the second UE based on the same waveform used for the first signal.

In one design, the particular waveform may be the downlink waveform for the WAN. The first UE may generate the first signal in different manners, e.g., depending on whether the first UE is acting as a P2P group owner or a P2P client. In one design of block 612, the first UE may determine information to send in at least one downlink signal or channel and may generate the first signal comprising the at least one downlink signal or channel carrying the information. The at least one downlink signal or channel may comprise at least one synchronization signal (e.g., PSS and SSS), or at least one reference signal (e.g., CRS, UE-RS, and/or CSI-RS), or a downlink control channel (e.g., PDCCH or R-PDCCH), or a downlink shared channel (e.g., PDSCH), or a combination thereof.

In another design of block 612, the first UE may determine information to send in at least one uplink signal or channel and may map the at least one uplink signal or channel to at least one downlink signal or channel. The first UE may then generate the first signal comprising the at least one downlink signal or channel carrying the information. The at least one uplink signal or channel may comprise at least one reference signal (e.g., SRS and/or DMRS), or a random access channel (e.g., PRACH), or an uplink control channel (e.g., PUCCH), or an uplink shared channel (e.g., PUSCH), or a combination thereof.

Uplink signals and channels in the uplink waveform may be mapped to downlink signals and channels in the downlink waveform in various manners. Some exemplary designs of mapping uplink signals and channels to downlink signals and channels are described below.

In one design, the PRACH in the uplink waveform may be mapped to the PSS and SSS in the downlink waveform. The first UE may determine information to send on the PRACH and may generate the first signal comprising the PSS and SSS carrying the information to send on the PRACH.

In one design, the PUSCH in the uplink waveform may be mapped to the PDSCH in the downlink waveform. The UE may determine information to send on the PUSCH and may generate the first signal comprising the PDSCH carrying the information to send on the PUSCH.

In one design, the SRS in the uplink waveform may be mapped to the CRS in the downlink waveform. The first UE may generate the first signal comprising the CRS in at least one subband assigned to the first UE. In one design, the DMRS in the uplink waveform may be mapped to the CRS or UE-RS in the downlink waveform. The first UE may generate the first signal comprising (i) a downlink control channel or a downlink shared channel in at least one subband among a plurality of subbands and (ii) the CRS or UE-RS in only the at least one subband in which the downlink control channel or the downlink shared channel is sent.

In one design, the PUCCH in the uplink waveform may be mapped to the PDCCH in the downlink waveform. The first UE may generate the first signal comprising the PDCCH carrying CQI, PMI and/or RI. In one design, the PUCCH may be further mapped to the PHICH in the downlink waveform. The first UE may generate the first signal comprising the PHICH carrying ACK/NACK information and/or SR, which may be mapped to separate resources on the PHICH. In one design, the first signal may further comprise the PCFICH, which may indicate the size of a control region in which the PDCCH and PHICH are sent.

In another design, the PUCCH may be mapped to the PDSCH in the downlink waveform. The first UE may generate the first signal comprising the PDSCH carrying control information such as CQI, PMI, RI, ACK/NACK, SR, or a combination thereof. The CQI, PMI, RI, ACK/NACK and/or SR may be encoded separately and sent on different resources of the PDSCH. Alternatively, the CQI, PMI, RI, ACK/NACK and/or SR may be encoded jointly and sent on common resources of the PDSCH. The control information may be encoded based on either a coding scheme not used for sending data on the PDSCH or a coding scheme used for sending data on the PDSCH.

In yet another design, the PUCCH may be mapped to the M-PDCCH in the downlink waveform. The first UE may determine information to send on the PUCCH and may generate the first signal comprising the R-PDCCH carrying the information to send on the PUCCH.

In one design, the first UE may adjust the transmit power of the first signal based on an overall PSD of the first UE. In another design, the first UE may adjust the transmit power of each signal or channel separately, e.g., based on a target performance of that signal or channel.

LTE supports HARQ in order to improve reliability of data transmission and support rate adaptation for varying channel conditions. For HARQ, a transmitter may send a transmission of a transport block and may send one or more additional transmissions, if needed, until the transport block is decoded correctly by a receiver, or the maximum number of transmissions has been sent, or some other termination condition is encountered. A transport block may also be referred to as a packet, a codeword, etc. A transmission of a transport block may be referred to as an HARQ transmission.

Figure 7:
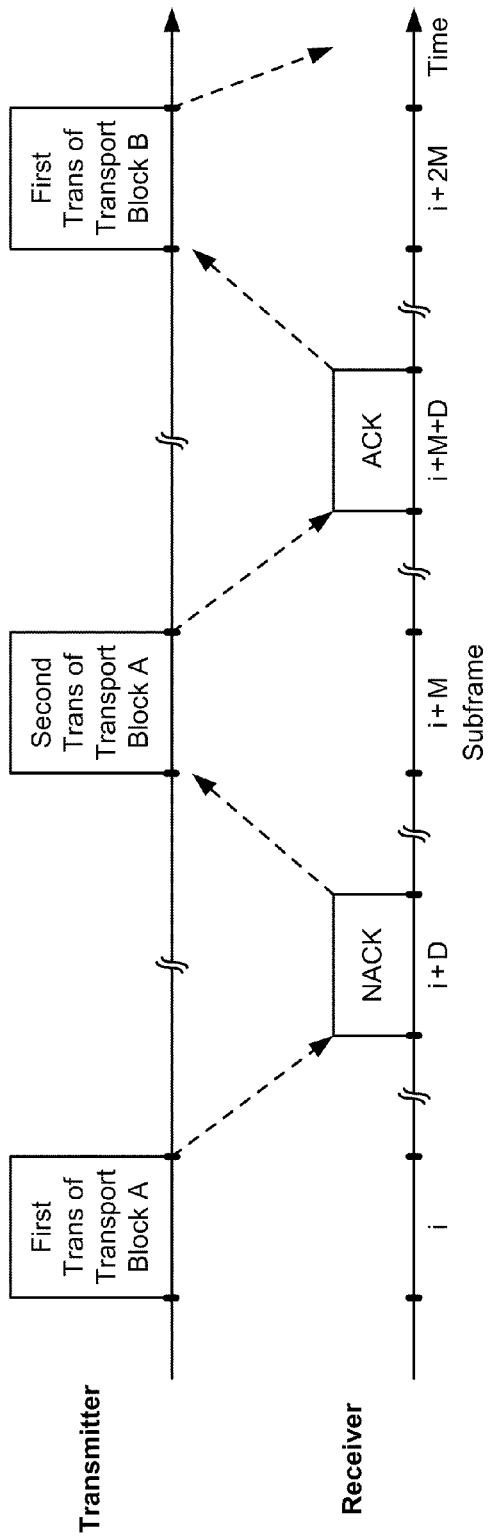
FIG. 7 shows data transmission with hybrid automatic repeat request (HARQ).

FIG. 7 shows an example of data transmission with HARQ. In the example shown in FIG. 7, a transmitter (e.g., an eNB or a UE) may have data to send to a receiver (e.g., a UE) and may process a transport block A based on a transport format to obtain data symbols. The transport format may be associated with a modulation and coding scheme (MCS), a transport block (TB) size, and/or other parameters for the transport block. The transmitter may send a first transmission of transport block A to the receiver in subframe i.

The receiver may receive and process the first transmission of transport block A. The receiver may decode transport block A in error and may send a NACK in subframe i+D, where D is a HARQ feedback delay and may be equal to 2, 3, 4, etc. The transmitter may receive the NACK from the receiver and may send a second transmission of transport block A in subframe i+M, where M may be equal to 4, 6, 8, etc. The receiver may receive the second transmission of transport block A from the transmitter and may process the first and second transmissions of transport block A. The receiver may decode transport block A correctly and may send an ACK in subframe i+M+D. The transmitter may receive the ACK from the receiver, terminate transmission of transport block A, and process and transmit another transport block B in similar manner.

A number of HARQ processes may be supported, and one or more transport blocks may be sent in each active HARQ process. One or more new transport blocks may be sent on an HARQ process upon termination of one or more transport blocks being sent on the HARQ process.

LTE supports synchronous HARQ on the uplink and/or asynchronous HARQ on the downlink. For synchronous HARQ, transmissions of a transport block may be sent in evenly spaced subframes of one time interlace, e.g., as shown in FIG. 7. For asynchronous HARQ, a transmission of a transport block may be scheduled and sent in any subframe. The techniques described herein may be used for both synchronous HARQ and asynchronous HARQ.

As noted above, a UE may communicate peer-to-peer with one or more other UEs. One challenge in setting up P2P links is discovery or detection of peer UEs of interest within a particular range. To facilitate peer detection, UEs that can and/or desire to communicate peer-to-peer may periodically transmit proximity detection signals. A proximity detection signal (PDS) may also be referred to as a peer detection signal, a peer discovery signal, etc. A UE may detect peer UEs near its proximity based on proximity detection signals transmitted by these peer UEs.

Proximity detection signals should be transmitted such that desensing can be mitigated. Desensing may occur when a receiver (e.g., a UE) receives signals from different transmitters (e.g., other UEs), and the signal from the strongest transmitter is much stronger than the signals from other transmitters. The receiver may perform automatic gain control (AGC) based on the signal from the strongest transmitter. The signals from the weaker transmitters may then be masked or desensed by the signal from the strongest transmitter and may be undetectable by the receiver. Desensing may occur even if the signals from different transmitters are frequency division multiplexed and transmitted on different frequency resources.

Proximity detection signals may be desensed by other signals transmitted by other UEs, e.g., signals transmitted by UEs to eNBs for WAN communication and/or signals transmitted by UEs to peer UEs for P2P communication. Desensing of the proximity detection signals by the other signals may be mitigated via time division multiplexing. In particular, certain subframes may be reserved for transmitting proximity detection signals. The proximity detection signals can then avoid being desensed by the other signals, which are not transmitted in the reserved subframes.

Proximity detection signals may also be desensed by other proximity detection signals. A UE may need to detect proximity detection signals transmitted by peer UEs, which may be randomly located within its range, e.g., within a radius of 1000 meters. The UE may have widely varying pathloss for different peer UEs, and the difference between the pathloss for a nearby UE and the pathloss for a distant UE may be as much as 60 decibels (dB). A strong proximity detection signal from the nearby UE may overpower a weak proximity detection signal from the distant UE, thereby making the distant UE undetectable. Desensing of weak proximity detection signals by strong proximity detection signals may be mitigated by having each UE transmits its proximity detection signal with a probability of $1-P_{blank}$, where $P_{blank}$ is the probability of a UE not transmitting its proximity detection signal.

Figure 8:
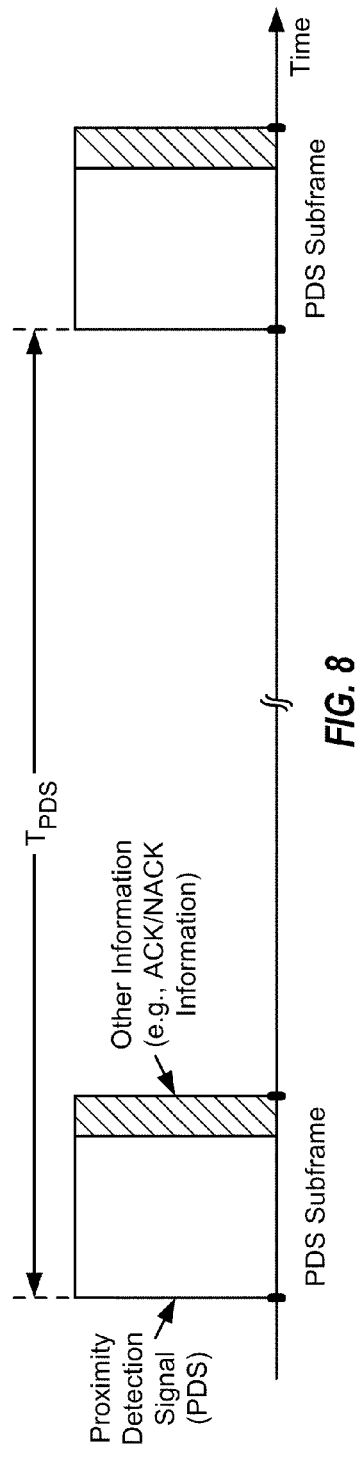
FIG. 8 shows a scheme for transmitting proximity detection signals.

FIG. 8 shows a design of a scheme for transmitting proximity detection signals. In this design, some subframes may be reserved for transmitting proximity detection signals and may be referred to as PDS subframes. The PDS subframes may be spaced apart by $T_{PDS}$ ms, which may be referred to as the PDS periodicity. A UE may transmit its proximity detection signal in each PDS subframe with a probability of $1-P_{blank}$.

In another aspect, a proximity detection signal may be transmitted in a portion of a PDS subframe instead of the entire PDS subframe. The remaining portion of the PDS subframe may be used to transmit control information and/or other information to support P2P communication. This may improve performance and avoid delay. For example, two UEs may communicate peer-to-peer, the first UE may transmit data with HARQ as shown in FIG. 7, and the second UE may transmit ACK/NACK based on a predetermined HARQ timeline as also shown in FIG. 7. The second UE may have ACK/NACK to transmit in a particular subframe (e.g., subframe i+D in FIG. 7), which may happen to be a PDS subframe. If P2P UEs transmit their proximity detection signals in the entire PDS subframe, then the second UE may not be able to reliably transmit its ACK/NACK in this subframe. The PDS subframe would then break the normal HARQ timeline, which may lead to additional transmission of a transport block and a longer HARQ delay. By transmitting the proximity detection signals in only a portion of the PDS subframe, the remaining portion may be used to transmit ACK/NACK.

In general, a proximity detection signal may be transmitted in any portion of a subframe and in any number of symbol periods in the subframe. The proximity detection signal may be transmitted in fewer symbol periods to enable control information to be transmitted in more remaining symbol periods. Alternatively, the proximity detection signal may be transmitted in more symbol periods to provide better peer detection performance. For clarity, a specific design of transmitting the proximity detection signal is described below.

Figure 9:
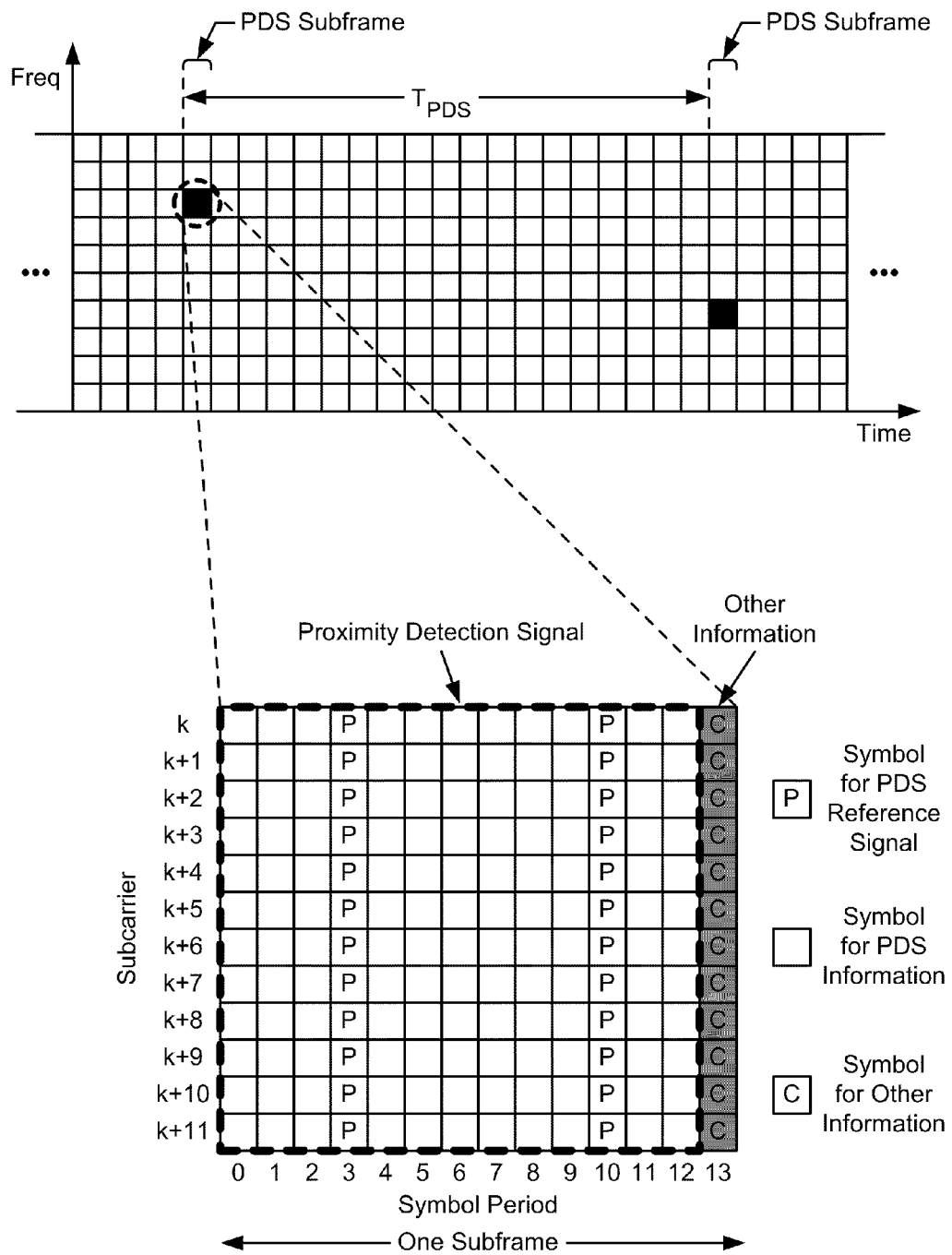
FIG. 9 shows transmission of a proximity detection signal in a portion of a subframe.

FIG. 9 shows a design of transmitting a proximity detection signal in a portion of a PDS subframe. In one design, a UE may transmit a proximity detection signal on a pair of resource blocks in a PDS subframe. In one design, the UE may transmit the proximity detection signal on the same set of subcarriers in all PDS subframes without frequency hopping (not shown in FIG. 9). In another design, the UE may transmit the proximity detection signal on different sets of subcarriers in different PDS subframes with frequency hopping, as shown in FIG. 9. The subcarriers to use for the proximity detection signal may be selected based on a PN sequence, or a predetermined hopping sequence, or some other sequence.

In one design, a proximity detection signal may be transmitted on 12 subcarriers in the first 2L-1 symbol periods of a PDS subframe. The proximity detection signal may thus be transmitted (i) in the first 13 symbol periods 0 through 12 of the PDS subframe for the normal cyclic prefix (as shown in FIG. 9) or (ii) in the first 11 symbol periods 0 through 10 of the PDS subframe for the extended cyclic prefix (not shown in FIG. 9). The proximity detection signal may be transmitted on all resource elements of a pair of resource blocks except for the resource elements in the last symbol period of the PDS subframe. Control information may be transmitted in the last symbol period of the PDS subframe, as described below.

In one design, a proximity detection signal may be generated based on the PUSCH. In another design, a proximity detection signal may be generated based on the PUCCH. For both designs, a proximity detection signal may include a peer detection reference signal (PD-RS) and either a peer detection transmission on the PUSCH (which is referred to as a PD-PUSCH) or a peer detection transmission on the PUCCH (which is referred to as a PD-PUCCH). The PD-RS may be used for coherent detection of the data portion (e.g., the PD-PUSCH or PD-PUCCH) of the proximity detection signal.

FIG. 9 shows an exemplary design of a proximity detection signal comprising the PD-RS and PD-PUSCH or PD-PUCCH. In this design, the PD-RS occupies symbol periods 3 and 10, and the PD-PUSCH or PD-PUCCH occupies symbol periods 0-2, 4-9, 11 and 12. The PD-PUSCH or PD-PUCCH may carry information for the proximity detection signal, e.g., an ID of a UE transmitting the proximity detection signal, auxiliary information such as service type, etc.

The PD-PUSCH and PD-PUCCH may be generated in different manners. In one design of the PD-PUSCH, information to send in a proximity detection signal may be processed based on a particular MCS to generate modulation symbols, which may then be mapped to resource elements for the PD-PUSCH. In one design of the PD-PUCCH, information to send in a proximity detection signal may be processed to generate a set of modulation symbols. Each modulation may be used to modulate a spreading sequence to generate a corresponding modulated sequence. Each modulated sequence may be mapped to resource elements for the PD-PUCCH in one symbol period. The spreading sequence may be assigned to a UE transmitting the proximity detection signal and may be one of a set of spreading sequences available for use. The spreading sequence may be a Zadoff-Chu sequence, a computer-generated sequence, or some other sequence having good correlation properties, e.g., constant amplitude zero auto correlation (CAZAC) properties.

The PUSCH and PUCCH are typically transmitted in all 2L symbol periods of a subframe. In a first design, information to send in a proximity detection signal may be processed in similar manner as for the PUSCH or PUCCH to generate symbols for an entire subframe. Some of these symbols may then be punctured (i.e., deleted) to obtain symbols for the PD-PUSCH or PD-PUCCH. In the first design, the processing for the PD-PUSCH or PD-PUCCH may be the same or similar to the processing for the PUSCH or PUCCH, but the symbols for the last symbol period may be punctured to obtain a shortened PUSCH or PUCCH for the PD-PUSCH or PD-PUCCH. In a second design, information to send in a proximity detection signal may be encoded with a higher code rate and mapped to modulation symbols for only the symbol periods in which the proximity detection signal is transmitted (e.g., for only 13 symbol periods for the normal cyclic prefix). The higher code rate may generate a shorter codeword, which may be sent in its entirety in the symbol periods in which the proximity detection signal is transmitted. The first design may simplify UE implementation since the same encoder and decoder used for the PUSCH or PUCCH may also be used for the PD-PUSCH or PD-PUCCH. The second design may provide better performance by matching the codeword for the proximity detection signal to the amount of resources available to transmit the proximity detection signal.

A proximity detection signal may also be processed and transmitted in a portion of a subframe in other manners. The information for the proximity detection signal may be processed (i) in the same or similar manner as the PUSCH or PUCCH or (ii) in some other manner different from the PUSCH and PUCCH.

A UE may transmit a proximity detection signal in a portion of a PDS subframe, as described above. The UE may or may not transmit other information in the remaining portion of the PDS subframe. Regardless, the UE may avoid transmitting its proximity detection signal in the remaining portion of the PDS subframe so that the UE or some other UE can transmit other information in this portion of the subframe. In one design, the other information may be transmitted on only the subcarriers on which the proximity detection signal is transmitted. For the example shown in FIG. 9, the other information may be transmitted on 12 subcarriers in one resource block. In another design, the other information may be transmitted on more subcarriers than the proximity detection signal. For example, the proximity detection signal may be transmitted on 12 subcarriers for one resource block, and the other information may be transmitted on 24, 36, 48 or some other number of subcarriers. In general, the other information may be transmitted on resources that may be assigned for transmitting that information.

In general, any information may be transmitted in the remaining portion of a PDS subframe that is not used to transmit a proximity detection signal. In one design, ACK/NACK may be transmitted in the remaining portion of the PDS subframe. In another design, other control information such as CQI/PMI/RI, or SR, or some other information, or any combination thereof may be transmitted in the remaining portion of the PDS subframe. In one design, the remaining portion of the PDS subframe may be used to transmit other information (e.g., ACK/NACK) to support P2P communication between UEs.

The information to transmit in the remaining portion of a PDS subframe may be processed and transmitted in various manners. In one design, the information may be processed based on a MCS to obtain a set of modulation symbols, which may be mapped to resource elements in the remaining portion of the PDS subframe. In another design, the information may be processed to generate one or more modulation symbols, which may be used to modulate a spreading sequence to obtain one modulated sequence for each modulation symbol. Each modulated sequence may then be transmitted in one symbol period in the remaining portion of the PDS subframe. The information may also be processed and transmitted in the remaining portion of the PDS subframe in other manners.

In one design, ACK/NACK may be transmitted in one symbol period (e.g., the last symbol period) of a PDS subframe in similar manner as a SRS. A UE may transmit a SRS in an integer multiple of four resource blocks (e.g., in 4, 8 or 12 resource blocks) to enable an eNB to estimate the channel quality of the uplink from the UE to the eNB. The UE may generate the SRS based on a spreading sequence assigned to the UE and may transmit the SRS in the last symbol of a subframe. The assigned spreading sequence may be a cyclically shifted version of a base sequence of a suitable length. The base sequence may be a Zadoff-Chu sequence, a computer-generated sequence, etc.

A UE may transmit ACK/NACK in similar manner as a SRS. In one design, the UE may be assigned two spreading sequences, which may be two cyclic shifts of a base sequence. One spreading sequence may be used to convey ACK, and the other spreading sequence may be used to convey NACK. To transmit ACK, the UE may generate a SRS based on the spreading sequence assigned for ACK and may transmit the SRS in the last symbol period on all resource blocks assigned to the UE for transmitting ACK/NACK. Similarly, to transmit NACK, the UE may generate a SRS based on the spreading sequence assigned for NACK and may transmit the SRS in the last symbol period on all resource blocks assigned to the UE for transmitting ACK/NACK. The SRS carrying ACK/NACK may be indistinguishable from a SRS used for channel estimation.

A receiver (e.g., a peer UE) may detect the ACK/NACK from the UE in various manners. In one design, the receiver may perform non-coherent detection and may correlate a received signal at the receiver with each of the two spreading sequences assigned to the UE for ACK and NACK. The receiver may compute the detected energy for each spreading sequence, as follows:

$$E_{ACK} = \sum_{n} |R(n) \cdot S^*_{ACK}(n)|^2, \text{ and} \qquad \text{Eq (1)}$$

$$E_{NACK} = \sum_{n} |R(n) \cdot S^*_{NACK}(n)|^2, \qquad \text{Eq (2)}$$

where
  R(n) is a received sample at the receiver in sample period n,
  $S_{ACK}(n)$ is a sample of the spreading sequence for ACK,
  $S_{NACK}(n)$ is a sample of the spreading sequence for NACK,
  $E_{ACK}$ is the detected energy for ACK,
  $E_{NACK}$ is the detected energy for NACK, and
  "*" denotes a complex conjugate.

The receiver may compute a ratio R of the two detected energies, as follows:

$$R = \frac{E_{ACK}}{E_{NACK}}. \qquad \text{Eq (3)}$$

The receiver may determine whether ACK, or NACK, or neither was sent by the UE based on the ratio. In one design, the receiver may declare a detected ACK if R is greater than a first threshold TH1, which may be any suitable value greater than one. The receiver may declare a detected NACK if R is less than a second threshold TH2, which may be any suitable value less than one. The receiver may declare no ACK or NACK (i.e., DTX) if R is between the first and second thresholds. The receiver may also declare ACK only if $E_{ACK}$ is greater than a minimum energy threshold THa, and may declare NACK only if $E_{NACK}$ is greater than a minimum energy threshold THn. The receiver may also perform non-coherent detection for ACK/NACK in other manners.

When the PUSCH and SRS are both transmitted in the same subframe, the PUSCH transmission may be shortened to 13 symbols with the normal cyclic prefix, and the SRS may be transmitted in the last symbol period. In one design that is described above, a proximity detection signal may be transmitted in all but the last symbol period of a subframe using the shortened PUSCH/PUCCH format, and the last symbol period of the subframe may be used to transmit other information (e.g., ACK/NACK) using the SRS format. The proximity detection signal and the other information may also be transmitted in other manners, as described above. The techniques described herein may provide one or more of the following advantages:

High multiplexing capability to enable more UEs to transmit proximity detection signals since each proximity detection signal may be transmitted in a small number of (e.g., two) resource blocks in one subframe, Maintain HARQ timeline for P2P communication even when proximity detection signals are transmitted, Reuse of LTE physical channels such as PUSCH or PUCCH to transmit a proximity detection signal, and Reuse of SRS format to transmit ACK/NACK with non-coherent detection.

For example, eight time interlaces 0 through 7 may be defined, and two time interlaces 0 and 3 may be allocated for P2P communication. Data may be sent in subframes of one time interlace (e.g., time interlace 0), and ACK/NACK may be sent in subframes of the other time interlace (e.g., time interlace 3). Some subframes in time interlace 3 may be reserved as PDS subframes. By allowing proximity detection signals and ACK/NACK to be multiplexed and transmitted in the PDS subframes, the HARQ timing for P2P communication may be maintained.

FIG. 10 shows a design of a process 1000 for transmitting a proximity detection signal. Process 1000 may be performed by a UE (as described below) or by some other entity. The UE may generate a proximity detection signal based on a physical channel (e.g., the PUSCH or PUCCH) for a WAN (block 1012). The UE may transmit the proximity detection signal in a portion of a first subframe to enable at least one other UE to detect the UE (block 1014). The UE may transmit the physical channel in an entirety of a second subframe for communication with the WAN (block 1016). The UE may thus transmit the physical channel in different manners for the proximity detection signal and for WAN communication.

In one design, the UE may transmit the proximity detection signal in all symbol periods except for the last symbol period of the first subframe, e.g., as shown in FIG. 9. In one design, the UE may transmit the proximity detection signal on 12 subcarriers for one resource block in the portion of the first subframe, e.g., as also shown in FIG. 9.

In one design, the physical channel may comprise the PUSCH. In one design of block 1012, the UE may generate a set of modulation symbols based on information to send in the proximity detection signal. The UE may map the set of modulation symbols to a set of resource elements for the PUSCH in the portion of the first subframe. The UE may then generate the proximity detection signal based on the set of modulation symbols mapped to the set of resource elements.

In another design, the physical channel may comprise the PUCCH. In another design of block 1012, the UE may generate a set of modulation symbols based on information to send in the proximity detection signal. The UE may modulate a spreading sequence with the set of modulation symbols to generate a set of modulated sequences, one modulated sequence for each modulation symbol. The UE may map the set of modulated sequences to a set of resource elements for the PUCCH in the portion of the first subframe, one modulated sequence in each symbol period in the portion of the first subframe. The UE may then generate the proximity detection signal based on the set of modulated sequences mapped to the set of resource elements.

In one design, the UE may perform puncturing to transmit the proximity detection signal in a portion of the first subframe. The UE may generate a codeword based on information to send in the proximity detection signal and in accordance with a code rate selected for the entire first subframe. The UE may puncture or delete a portion of the codeword and may generate the proximity detection signal based on the remaining portion of the codeword that is not punctured.

In another design, the UE may perform rate matching to transmit the proximity detection signal in a portion of the first subframe. The UE may generate a codeword based on information to send in the proximity detection signal and in accordance with a code rate selected based on the portion of the first subframe. The UE may then generate the proximity detection signal based on all of the codeword.

In one design, the UE may determine whether or not to transmit the proximity detection signal in the first subframe based on a probability of blanking the proximity detection signal by the UE. The UE may transmit the proximity detection signal in the portion of the first subframe in response to a determination to transmit the proximity detection signal. In one design, the first subframe may be reserved for transmitting proximity detection signals by UEs.

In one design, the UE may select a set of subcarriers for the proximity detection signal based on a PN sequence or a predetermined hopping pattern. The UE may generate the proximity detection signal for transmission on the set of subcarriers in the portion of the first subframe.

In one design, the UE may transmit or receive control information (e.g., ACK/NACK information) in the remaining portion of the first subframe. In another design, another UE may transmit control information in the remaining portion of the first subframe. For both designs, the control information may be used to support P2P communication between UEs.

FIG. 11 shows a design of a process 1100 for detecting proximity detection signals. Process 1100 may be performed by a UE (as described below) or by some other entity. The UE may detect at least one proximity detection signal transmitted by at least one other UE in a portion of a first subframe (block 1112). Each proximity detection signal may be generated based on a physical channel (e.g., the PUSCH or PUCCH) for a WAN. In one design, the at least one proximity detection signal may be transmitted in all symbol periods except for the last symbol period of the first subframe. The UE may identify the at least one other UE based on the at least one proximity detection signal detected in the portion of the first subframe (block 1114). The UE may communicate peer-to-peer with one or more of the at least one other UE. The UE may transmit the physical channel in an entirety of a second subframe for communication with the WAN (block 1116).

In one design, the physical channel may comprise the PUSCH. The UE may obtain at least one set of received symbols from at least one set of resource elements in the portion of the first subframe, one set of received symbols for each of the at least one proximity detection signal. Each set of received symbols may correspond to a set of modulation symbols for one proximity detection signal. The UE may demodulate and decode the at least one set of received symbols to obtain information sent in the at least one proximity detection signal.

In another design, the physical channel may comprise the PUCCH. The UE may obtain at least one set of received symbols from at least one set of resource elements in the portion of the first subframe, one set of received symbols for each of the at least one proximity detection signal. The UE may despread the at least one set of received symbols with at least one spreading sequence to obtain at least one set of despread symbols, one set of despread symbols for each of the at least one proximity detection signal. The UE may demodulate and decode the at least one set of despread symbols to obtain information sent in the at least one proximity detection signal.

In one design, the UE may send control information to, or received control information from, another UE in the remaining portion of the first subframe. In another design, some other UE may send control information in the remaining portion of the first subframe for P2P communication.

Figures 12, 13:
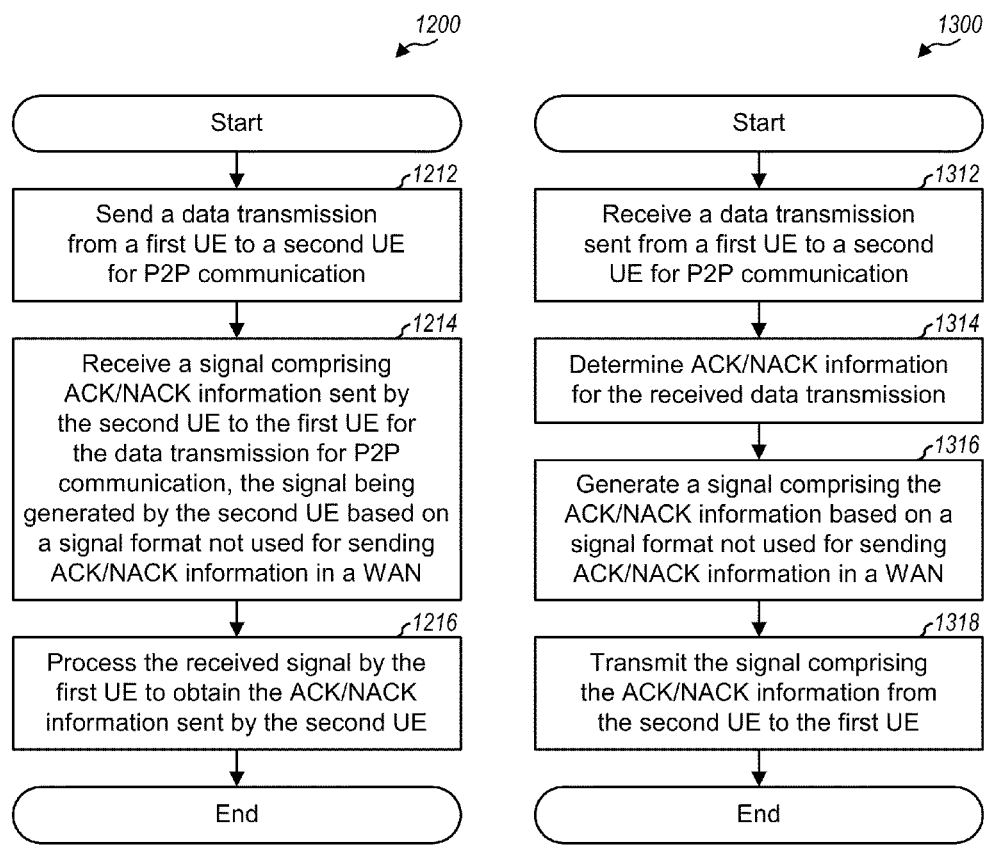
FIG. 12 shows a process for transmitting ACK/NACK information.
FIG. 13 shows a process for receiving ACK/NACK information.

FIG. 12 shows a design of a process 1200 for receiving ACK/NACK information for P2P communication. Process 1200 may be performed by a first UE communicating peer-to-peer with a second UE. The first UE may send a data transmission to the second UE for P2P communication (block 1212). The first UE may receive a signal comprising ACK/NACK information sent by the second UE to the first UE for the data transmission for P2P communication (block 1214). The signal may be generated by the second UE based on a signal format not used for sending ACK/NACK information in a WAN. In one design, the signal comprising the ACK/NACK information may be generated based on a signal format for the SRS in the WAN. The first UE may process the received signal to obtain the ACK/NACK information sent by the second UE (block 1216).

In one design of block 1216, the first UE may correlate the received signal with a set of spreading sequences to obtain a set of correlation values, one correlation value for each spreading sequence. In one design, the set of spreading sequences may comprise a plurality of cyclic shifts of a base sequence. The base sequence may comprise a Zadoff-Chu sequence, a computer-generated sequence, or some other sequence having good correlation properties. The first UE may determine the ACK/NACK information based on the set of correlation values. In one design, the first UE may correlate the received signal with (i) a first spreading sequence for ACK to obtain a first correlation value and (ii) a second spreading sequence for NACK to obtain a second correlation value. The first UE may determine whether ACK or NACK was sent by the second UE based on the first and second correlation values. In one design, the first UE may determine a ratio based on the first and second correlation values, e.g., as shown in equation (3). The first UE may declare ACK was sent if the ratio is above a first threshold, declare NACK was sent if the ratio is below a second threshold, and declare no ACK or NACK was sent if the ratio is between the first and second thresholds.

In one design, the first UE may receive the signal comprising the ACK/NACK information in a single symbol period (e.g., the last symbol period) of the subframe. The subframe may be reserved for transmitting proximity detection signals by UEs. In one design, the first UE may receive the signal comprising the ACK/NACK information on resource elements in an integer multiple of four resource blocks. The signal comprising the ACK/NACK information may also be generated and transmitted in other manners.

FIG. 13 shows a design of a process 1300 for transmitting ACK/NACK information for P2P communication. Process 1300 may be performed by a second UE communicating peer-to-peer with a first UE. The second UE may receive a data transmission sent by the first UE for P2P communication (block 1312). The second UE may determine ACK/NACK information for the received data transmission (block 1314). The second UE may generate a signal comprising the ACK/NACK information based on a signal format that is not used for sending ACK/NACK information in a WAN (block 1316). The second UE may transmit the signal comprising the ACK/NACK information to the first UE (block 1318).

In one design, the second UE may generate the signal comprising the ACK/NACK information based on a signal format for the SRS. The SRS may support channel quality measurement in the WAN and may not be transmitted when the signal comprising the ACK/NACK information is transmitted for P2P communication. The second UE may also generate the signal comprising the ACK/NACK information based on some other signal format for the WAN.

In one design, the second UE may select a spreading sequence in a set of spreading sequences based on the ACK/NACK information. Each spreading sequence in the set of spreading sequences may be associated with a different possible value of the ACK/NACK information. The second UE may generate the signal comprising the ACK/NACK information based on the selected spreading sequence. In one design, the set of spreading sequences includes a first spreading sequence for transmitting ACK and a second spreading sequence for transmitting NACK. The second UE may generate the signal comprising the ACK/NACK information based on (i) the first spreading sequence if the ACK/NACK information comprises ACK or (ii) the second spreading sequence if the ACK/NACK information comprises NACK.

In one design, the second UE may transmit the signal comprising the ACK/NACK information in a single symbol period (e.g., the last symbol period) of a subframe. The subframe may be reserved for transmitting proximity detection signals by UEs. The second UE may also generate and transmit the signal occupying resource elements in an integer multiple of four resource blocks. The second UE may transmit no reference signal with the signal. The signal comprising the ACK/NACK information may also be generated and transmitted in other manners.

Figure 14:
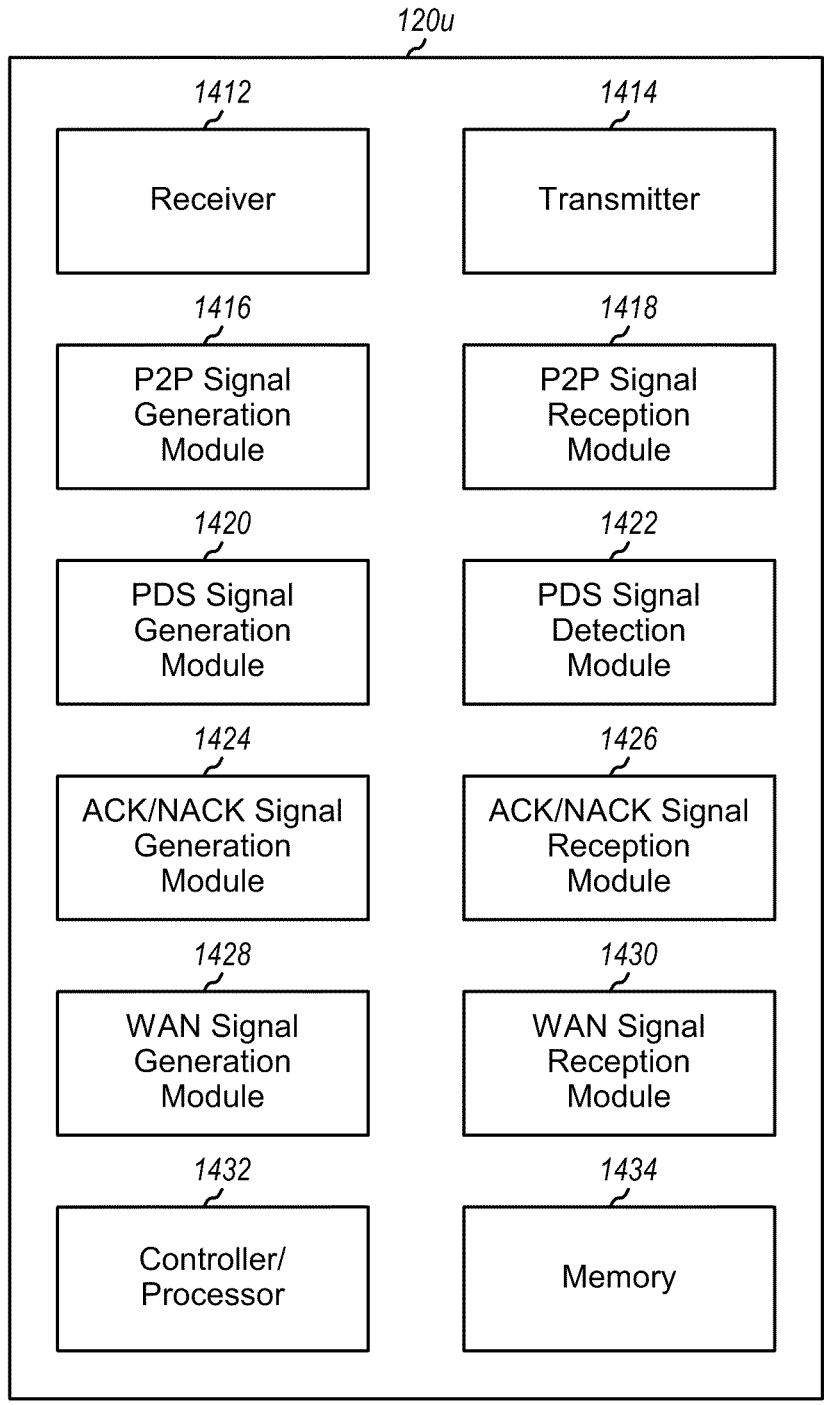
FIG. 14 shows a block diagram of a UE.

FIG. 14 shows a block diagram of a design of a UE 120u, which may be one of the UEs in FIG. 1. Within UE 120u, a receiver 1412 may receive P2P signals transmitted by other UEs for P2P communication and downlink signals transmitted by eNBs for WAN communication. A transmitter 1414 may transmit P2P signals to other UEs for P2P communication and uplink signals to eNBs for WAN communication. A module 1416 may generate P2P signals (e.g., based on a downlink waveform for a WAN) and may send the P2P signals to other UEs for P2P communication. A module 1418 may receive P2P signals from other UEs and may process the received P2P signals (e.g., based on the downlink waveform for the WAN). A module 1420 may generate a proximity detection signal for UE 120u (e.g., based on a shortened PUSCH or PUCCH format) and may send the proximity detection signal to enable other UEs to detect the presence of UE 120u. A module 1422 may detect proximity detection signals from other UEs (e.g., based on the shortened PUSCH or PUCCH format). A module 1424 may generate a signal comprising ACK/NACK and/or other information (e.g., based on a SRS format) and may send the signal in a portion (e.g., the last symbol period) of a subframe. A module 1426 may receive signals comprising ACK/NACK and transmitted by other UEs in a portion of a subframe. A module 1428 may generate uplink signals (e.g., based on an uplink waveform for the WAN) and may send the uplink signals to eNBs for WAN communication. A module 1430 may receive downlink signals from eNBs and may process the received downlink signals (e.g., based on the downlink waveform for the WAN).

The various modules within UE 120u may operate as described above. A controller/processor 1432 may direct the operation of various modules within UE 120u. A memory 1434 may store data and program codes for UE 120u. The modules within UE 120u may comprise processors, electronic devices, hardware devices, electronic components, logical circuits, memories, software codes, firmware codes, etc., or any combination thereof.

Figure 15:
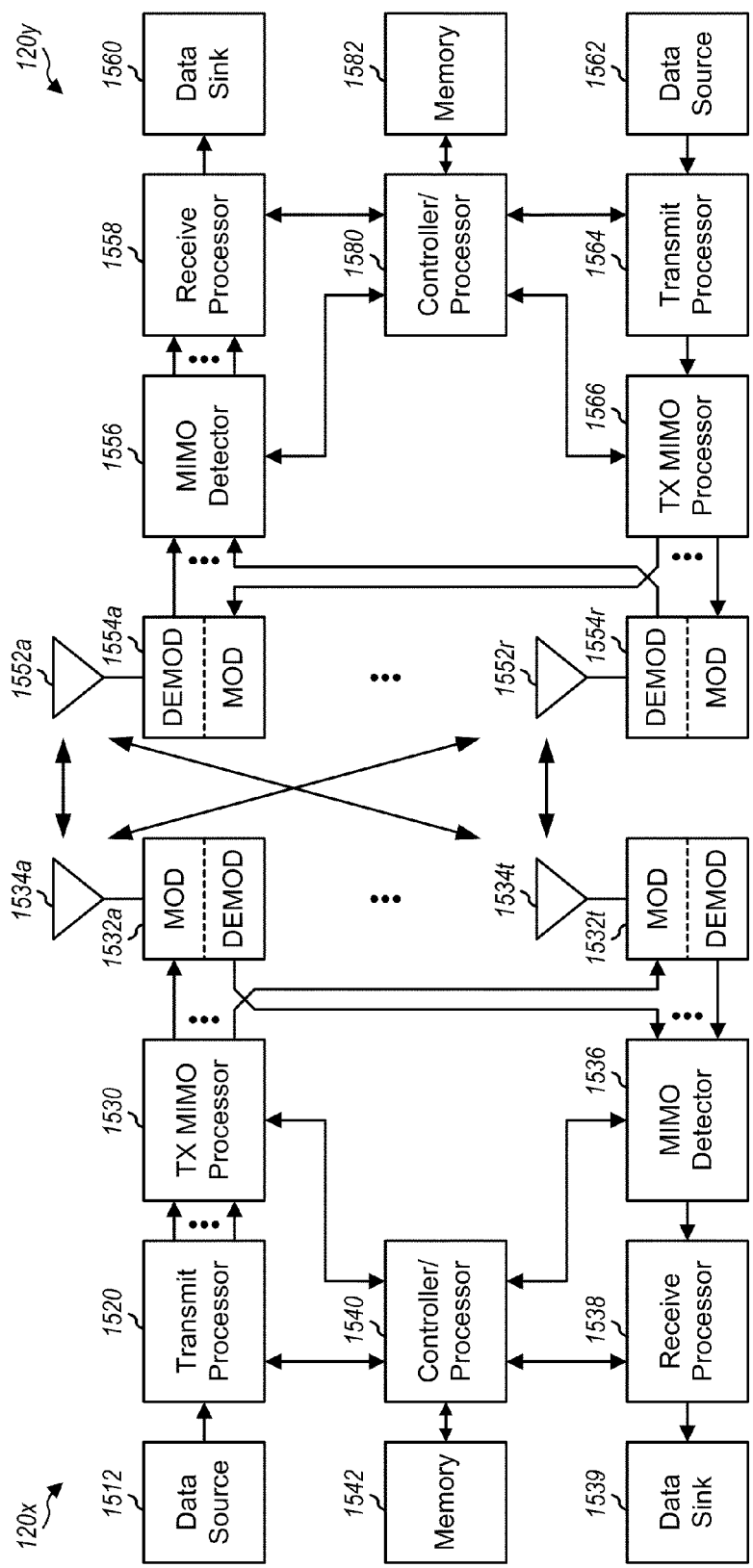
FIG. 15 shows a block diagram of two UEs communicating peer-to-peer.

FIG. 15 shows a block diagram of a design of UEs 120x and 120y in FIG. 1. In this design, UE 120x is equipped with T antennas 1534a through 1534t, and UE 120y is equipped with R antennas 1552a through 1552r, where in general $T \geq 1$ and $R \geq 1$.

At UE 120x, a transmit processor 1520 may receive data from a data source 1512 and control information from a controller/processor 1540. The control information may comprise CQI, PMI, RI, ACK/NACK, SR, etc. Transmit processor 1520 may process (e.g., encode, interleave, and symbol map) the data and control information and provide data symbols and control symbols, respectively. Transmit processor 1520 may also generate reference symbols for one or more synchronization signals (e.g., PSS and SSS), one or more reference signals (e.g., CRS, SRS, PD-RS, etc.), a proximity detection signal, etc. A transmit (TX) multiple-input multiple-output (MIMO) processor 1530 may perform spatial processing (e.g., precoding) on the data symbols, the control symbols, and/or the reference symbols, if applicable, and may provide T output symbol streams to T modulators (MODs) 1532a through 1532t. Each modulator 1532 may process a respective output symbol stream (e.g., for OFDM, SC-FDM, etc.) to obtain an output sample stream. Each modulator 1532 may further process (e.g., convert to analog, amplify, filter, and upconvert) the output sample stream to obtain a modulated signal. T modulated signals from modulators 1532a through 1532t may be transmitted via T antennas 1534a through 1534t, respectively.

At UE 120y, antennas 1552a through 1552r may receive the modulated signals from UE 120x and downlink signals from eNBs and may provide received signals to demodulators (DEMODs) 1554a through 1554r, respectively. Each demodulator 1554 may condition (e.g., filter, amplify, downconvert, and digitize) a respective received signal to obtain received samples. Each demodulator 1554 may further process the received samples (e.g., for OFDM, SC-FDM, etc.) to obtain received symbols. A MIMO detector 1556 may obtain received symbols from all R demodulators 1554a through 1554r, perform MIMO detection on the received symbols if applicable, and provide detected symbols. A receive processor 1558 may process (e.g., demodulate, deinterleave, and decode) the detected symbols, provide decoded data to a data sink 1560, and provide decoded control information to a controller/processor 1580.

At UE 120y, data from a data source 1562, control information (e.g., CQI, PMI, RI, ACK/NACK, SR, etc.) from controller/processor 1580, and reference symbols may be processed by a transmit processor 1564, precoded by a TX MIMO processor 1566 if applicable, further processed by modulators 1554, and transmitted via antennas 1552. At UE 120x, the modulated signals from UE 120y and downlink signals from eNBs may be received by antennas 1534, processed by demodulators 1532, detected by a MIMO detector 1536 if applicable, and further processed by a receive processor 1538 to obtain the decoded data and control information transmitted by UE 120y and eNBs to UE 120x.

For P2P communication, UEs 120x and 120y may generate P2P signals comprising the same waveform (e.g., the downlink waveform), and each UE may transmit its P2P signal to the other UE. Each UE may also generate and transmit a proximity detection signal in a portion of a PDS subframe. Each UE may transmit or receive other information (e.g., ACK/NACK) in the remaining portion of a PDS subframe. Each UE may also receive downlink signal from eNBs and may transmit uplink signals to eNBs for WAN communication.

Controllers/processors 1540 and 1580 may direct the operation at UEs 120x and 120y, respectively. Controllers/processors 1540 and 1580 may each perform or direct process 600 in FIG. 6, process 1000 in FIG. 10, process 1100 in FIG. 11, process 1200 in FIG. 12, process 1300 in FIG. 13, and/or other processes for the techniques described herein. Memories 1542 and 1582 may store data and program codes for UEs 120x and 120y, respectively.

In one configuration, apparatus 120u, 120x, or 120y for wireless communication may include means for generating a first signal based on a particular waveform by a first UE, the particular waveform being a downlink waveform or an uplink waveform for a WAN, means for transmitting the first signal from the first UE to a second UE for P2P communication, and means for receiving a second signal transmitted by the second UE to the first UE for P2P communication, the second signal being generated by the second UE based on the particular waveform used for the first signal.

In another configuration, apparatus 120u, 120x, or 120y for wireless communication may include means for generating a proximity detection signal for a UE based on a physical channel for a WAN, means for transmitting the proximity detection signal in a portion of a first subframe to enable at least one other UE to detect the UE, and means for transmitting the physical channel in an entirety of a second subframe for communication with the WAN.

In yet another configuration, apparatus 120u, 120x, or 120y for wireless communication may include means for detecting, by a UE, at least one proximity detection signal transmitted by at least one other UE in a portion of a first subframe, each proximity detection signal being generated based on a physical channel for a WAN, means for identifying the at least one other UE based on the at least one proximity detection signal, and means for transmitting the physical channel by the UE in an entirety of a second subframe for communication with the WAN.

In yet another configuration, apparatus 120u, 120x, or 120y for wireless communication may include means for sending a data transmission from a first UE to a second UE for P2P communication, means for receiving a signal comprising ACK/NACK information sent by the second UE to the first UE for the data transmission for P2P communication, the signal being generated by the second UE based on a signal format not used for sending ACK/NACK information in a WAN, and means for processing the received signal by the first UE to obtain the ACK/NACK information sent by the second UE.

In yet another configuration, apparatus 120u, 120x, or 120y for wireless communication may include means for receiving a data transmission sent from a first UE to a second UE for P2P communication, means for determining ACK/NACK information for the received data transmission, means for generating a signal comprising the ACK/NACK information based on a signal format not used for sending ACK/NACK information in a WAN, and means for transmitting the signal comprising the ACK/NACK information from the second UE to the first UE.

In one aspect, the aforementioned means may be the processor(s) 1520, 1538 and/or 1540 at UE 120x and/or processors(s) 1558, 1564 and/or 1580 at UE 120y configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   generating a first signal based on a particular waveform at a first user equipment (UE), the particular waveform being a downlink waveform or an uplink waveform for a wireless communication network;
   transmitting the first signal from the first UE to a second UE for peer-to-peer (P2P) communication; and
   receiving a second signal transmitted by the second UE to the first UE for P2P communication, the second signal being generated by the second UE based on the particular waveform used for the first signal,
   wherein the particular waveform is the downlink waveform, and wherein the generating the first signal comprises determining information to send in at least one downlink signal or channel, and generating the first signal comprising the at least one downlink signal or channel carrying the information, and
   wherein the at least one downlink signal or channel comprises at least one synchronization signal, or at least one reference signal, or a downlink control channel, or a downlink shared channel, or a combination thereof.

2. A method for wireless communication, comprising:
   generating a first signal based on a particular waveform at a first user equipment (UE), the particular waveform being a downlink waveform or an uplink waveform for a wireless communication network;
   transmitting the first signal from the first UE to a second UE for peer-to-peer (P2P) communication; and
   receiving a second signal transmitted by the second UE to the first UE for P2P communication, the second signal being generated by the second UE based on the particular waveform used for the first signal,
   wherein the particular waveform is the downlink waveform, and wherein the generating the first signal comprises:
      determining information to send in at least one uplink signal or channel,
      mapping the at least one uplink signal or channel to at least one downlink signal or channel, and
      generating the first signal comprising the at least one downlink signal or channel carrying the information.

3. The method of claim 2, wherein the at least one uplink signal or channel comprises at least one reference signal, or a random access channel, or an uplink control channel, or an uplink shared channel, or a combination thereof.

4. A method for wireless communication, comprising:
   generating a first signal based on a particular waveform at a first user equipment (UE), the particular waveform being a downlink waveform or an uplink waveform for a wireless communication network;

transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a physical random access channel (PRACH) in the uplink waveform is mapped to a primary synchronization signal (PSS) and a secondary synchronization signal (SSS) in the downlink waveform, and wherein the generating the first signal comprises:
determining information to send on the PRACH, and
generating the first signal comprising the PSS and SSS carrying the information to send on the PRACH.

5. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a physical uplink shared channel (PUSCH) in the uplink waveform is mapped to a physical downlink shared channel (PDSCH) in the downlink waveform, and wherein the generating the first signal comprises:
determining information to send on the PUSCH, and
generating the first signal comprising the PDSCH carrying the information to send on the PUSCH.

6. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a sounding reference signal (SRS) in the uplink waveform is mapped to a cell-specific reference signal (CRS) in the downlink waveform, and wherein the generating the first signal comprises generating the first signal comprising the CRS in at least one subband assigned to the first UE.

7. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a demodulation reference signal (DMRS) in the uplink waveform is mapped to a cell-specific reference signal (CRS) or a UE-specific reference signal (UE-RS) in the downlink waveform, and wherein the generating the first signal comprises generating the first signal comprising a downlink control channel or a downlink shared channel in at least one subband among a plurality of subbands and further comprising the CRS or UE-RS in only the at least one subband in which the downlink control channel or the downlink shared channel is sent.

8. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a physical uplink control channel (PUCCH) in the uplink waveform is mapped to a physical downlink control channel (PDCCH) in the downlink waveform.

9. The method of claim 8, wherein the generating the first signal comprises generating the first signal comprising the PDCCH carrying channel quality indicator (CQI), or precoding matrix indicator (PMI), or rank indicator (RI), or a combination thereof.

10. The method of claim 8, wherein the PUCCH is further mapped to a physical hybrid ARQ indicator channel (PHICH) in the downlink waveform, and wherein the generating the first signal comprises generating the first signal comprising the PHICH carrying acknowledgement/negative acknowledgement (ACK/NACK) information, or a scheduling request (SR), or both.

11. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a physical uplink control channel (PUCCH) in the uplink waveform is mapped to a physical downlink shared channel (PDSCH) in the downlink waveform, and wherein the generating the first signal comprises generating the first signal comprising the PDSCH carrying channel quality indicator (CQI), or precoding matrix indicator (PMI), or rank indicator (RI), or acknowledgement/negative acknowledgement (ACK/NACK) information, or a scheduling request (SR), or a combination thereof.

12. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication; and
receiving a second signal transmitted by the second UE to the first UE for P2P communication, the second signal being generated by the second UE based on the particular waveform used for the first signal,
wherein a physical uplink control channel (PUCCH) in the uplink waveform is mapped to a relay physical control shared channel (R-PDCCH) in the downlink waveform, and wherein the generating the first signal comprises:
determining information to send on the PUCCH, and generating the first signal comprising the R-PDCCH carrying the information to send in the PUCCH.

13. A method for wireless communication, comprising:
generating a first signal based on a particular waveform at a first user equipment (UE), the particular waveform being a downlink waveform or an uplink waveform for a wireless communication network;
transmitting the first signal from the first UE to a second UE for peer-to-peer (P2P) communication;
receiving a second signal transmitted by the second UE to the first UE for P2P communication, the second signal being generated by the second UE based on the particular waveform used for the first signal; and
adjusting transmit power of the first signal based on an overall power spectral density (PSD) of the first UE.

14. An apparatus for wireless communication, comprising:
means for generating a first signal based on a particular waveform at a first user equipment (UE), the particular waveform being a downlink waveform or an uplink waveform for a wireless communication network;
means for transmitting the first signal from the first UE to a second UE for peer-to-peer (P2P) communication; and
means for receiving a second signal transmitted by the second UE to the first UE for P2P communication, the second signal being generated by the second UE based on the particular waveform used for the first signal,
wherein the particular waveform is the downlink waveform, and wherein the means for generating the first signal comprises:
means for determining information to send in at least one uplink signal or channel,
means for mapping the at least one uplink signal or channel to at least one downlink signal or channel, and
means for generating the first signal comprising the at least one downlink signal or channel carrying the information.

15. An apparatus for wireless communication, comprising:
at least one processor configured to generate a first signal based on a particular waveform at a first user equipment (UE), the particular waveform being a downlink waveform or an uplink waveform for a wireless communication network, to send the first signal from the first UE to a second UE for peer-to-peer (P2P) communication, and to receive a second signal transmitted by the second UE to the first UE for P2P communication, the second signal being generated by the second UE based on the particular waveform used for the first signal,
wherein the particular waveform is the downlink waveform, and wherein the at least one processor is configured to determine information to send in at least one uplink signal or channel, to map the at least one uplink signal or channel to at least one downlink signal or channel, and to generate the first signal comprising the at least one downlink signal or channel carrying the information.

16. A computer program product, comprising:
a non-transitory computer-readable medium comprising:
code for causing at least one processor to generate a first signal based on a particular waveform at a first user equipment (UE), the particular waveform being a downlink waveform or an uplink waveform for a wireless communication network,
code for causing the at least one processor to send the first signal from the first UE to a second UE for peer-to-peer (P2P) communication, and
code for causing the at least one processor to receive a second signal transmitted by the second UE to the first UE for P2P communication, the second signal being generated by the second UE based on the particular waveform used for the first signal,
wherein the particular waveform is the downlink waveform, and wherein the code for causing the at least one processor to generate the first signal is configured to determine information to send in at least one downlink signal or channel, and generate the first signal comprising the at least one downlink signal or channel carrying the information, and
wherein the at least one downlink signal or channel comprises at least one synchronization signal, or at least one reference signal, or a downlink control channel, or a downlink shared channel, or a combination thereof.

17. A method for wireless communication, comprising:
generating a proximity detection signal for a user equipment (UE) based on a physical channel for a wireless communication network;
transmitting the proximity detection signal in a portion of a first subframe to enable at least one other UE to detect the UE; and
transmitting the physical channel in an entirety of a second subframe for communication with the wireless communication network,
wherein the transmitting the proximity detection signal comprises transmitting the proximity detection signal in all symbol periods of the first subframe except for a last symbol period of the first subframe.

18. A method for wireless communication, comprising:
generating a proximity detection signal for a user equipment (UE) based on a physical channel for a wireless communication network;
transmitting the proximity detection signal in a portion of a first subframe to enable at least one other UE to detect the UE; and
transmitting the physical channel in an entirety of a second subframe for communication with the wireless communication network,
wherein the physical channel comprises a physical uplink shared channel (PUSCH), and wherein the generating the proximity detection signal comprises:
generating a set of modulation symbols based on information to send in the proximity detection signal,
mapping the set of modulation symbols to a set of resource elements for the PUSCH in the portion of the first subframe, and
generating the proximity detection signal based on the set of modulation symbols mapped to the set of resource elements.

19. A method for wireless communication, comprising:
generating a proximity detection signal for a user equipment (UE) based on a physical channel for a wireless communication network;
transmitting the proximity detection signal in a portion of a first subframe to enable at least one other UE to detect the UE; and
transmitting the physical channel in an entirety of a second subframe for communication with the wireless communication network,
wherein the physical channel comprises a physical uplink control channel (PUCCH), and wherein the generating the proximity detection signal comprises:
generating a set of modulation symbols based on information to send in the proximity detection signal, modulating a spreading sequence with the set of modulation symbols to generate a set of modulated sequences, one modulated sequence for each modulation symbol, mapping the set of modulated sequences to a set of resource elements for the PUCCH in the portion of the first subframe, one modulated sequence in each symbol period in the portion of the first subframe, and generating the proximity detection signal based on the set of modulated sequences mapped to the set of resource elements.

20. A method for wireless communication, comprising:

generating a proximity detection signal for a user equipment (UE) based on a physical channel for a wireless communication network;

transmitting the proximity detection signal in a portion of a first subframe to enable at least one other UE to detect the UE; and transmitting the physical channel in an entirety of a second subframe for communication with the wireless communication network, wherein the generating the proximity detection signal comprises:

generating a codeword based on information to send in the proximity detection signal and in accordance with a code rate selected for an entirety of the first subframe, puncturing a portion of the codeword, and generating the proximity detection signal based on a remaining portion of the codeword not punctured.

21. A method for wireless communication, comprising:

generating a proximity detection signal for a user equipment (UE) based on a physical channel for a wireless communication network;

transmitting the proximity detection signal in a portion of a first subframe to enable at least one other UE to detect the UE; and transmitting the physical channel in an entirety of a second subframe for communication with the wireless communication network, wherein the generating the proximity detection signal comprises:

generating a codeword based on information to send in the proximity detection signal and in accordance with a code rate selected based on the portion of the first subframe, and generating the proximity detection signal based on all of the codeword.

22. A method for wireless communication, comprising:

generating a proximity detection signal for a user equipment (UE) based on a physical channel for a wireless communication network;

transmitting the proximity detection signal in a portion of a first subframe to enable at least one other UE to detect the UE; and transmitting the physical channel in an entirety of a second subframe for communication with the wireless communication network, wherein the generating the proximity detection signal comprises:

selecting a set of subcarriers for the proximity detection signal based on a pseudo-random number (PN) sequence or a predetermined hopping pattern, and generating the proximity detection signal for transmission on the set of subcarriers in the portion of the first subframe.

23. A method for wireless communication, comprising:

generating a proximity detection signal for a user equipment (UE) based on a physical channel for a wireless communication network;

transmitting the proximity detection signal in a portion of a first subframe to enable at least one other UE to detect the UE;

transmitting the physical channel in an entirety of a second subframe for communication with the wireless communication network;

determining whether or not to transmit the proximity detection signal in the first subframe based on a probability of blanking the proximity detection signal by the UE; and transmitting the proximity detection signal in the portion of the first subframe in response to a determination to transmit the proximity detection signal.

24. The method of claim 17, further comprising:

transmitting control information in a remaining portion of the first subframe.

25. The method of claim 17, wherein a remaining portion of the first subframe is used to transmit control information to support peer-to-peer (P2P) communication between UEs.

26. An apparatus for wireless communication, comprising:

means for generating a proximity detection signal for a user equipment (UE) based on a physical channel for a wireless communication network;

means for transmitting the proximity detection signal in a portion of a first subframe to enable at least one other UE to detect the UE; and means for transmitting the physical channel in an entirety of a second subframe for communication with the wireless communication network, wherein the means for transmitting the proximity detection signal is configured to transmit the proximity detection signal in all symbol periods of the first subframe except for a last symbol period of the first subframe.

27. The apparatus of claim 26, wherein a remaining portion of the first subframe is used to transmit control information to support peer-to-peer (P2P) communication between UEs.

28. An apparatus for wireless communication, comprising:

at least one processor configured to generate a proximity detection signal for a user equipment (UE) based on a physical channel for a wireless communication network, to send the proximity detection signal in a portion of a first subframe to enable at least one other UE to detect the UE, and to send the physical channel in an entirety of a second subframe for communication with the wireless communication network, wherein the at least one processor configured to send the proximity detection signal is configured to send the proximity detection signal in all symbol periods of the first subframe except for a last symbol period of the first subframe.

29. The apparatus of claim 28, wherein a remaining portion of the first subframe is used to transmit control information to support peer-to-peer (P2P) communication between UEs.

30. A computer program product, comprising:

a non-transitory computer-readable medium comprising:

code for causing at least one processor to generate a proximity detection signal for a user equipment (UE) based on a physical channel for a wireless communication network, code for causing the at least one processor to send the proximity detection signal in a portion of a first subframe to enable at least one other UE to detect the UE, and code for causing the at least one processor to send the physical channel in an entirety of a second subframe for communication with the wireless communication network,
wherein the code for causing the at least one processor to send the proximity detection signal is configured to send the proximity detection signal in all symbol periods of the first subframe except for a last symbol period of the first subframe.

31. A method for wireless communication, comprising:
detecting, by a user equipment (UE), at least one proximity detection signal transmitted by at least one other UE in a portion of a first subframe, each proximity detection signal being generated based on a physical channel for a wireless communication network;
identifying the at least one other UE based on the at least one proximity detection signal; and
transmitting the physical channel by the UE in an entirety of a second subframe for communication with the wireless communication network,
wherein the detecting at least one proximity detection signal comprises detecting the at least one proximity detection signal transmitted by the at least one other UE in all symbol periods of the first subframe except for a last symbol period of the first subframe.

32. A method for wireless communication, comprising:
detecting, by a user equipment (UE), at least one proximity detection signal transmitted by at least one other UE in a portion of a first subframe, each proximity detection signal being generated based on a physical channel for a wireless communication network;
identifying the at least one other UE based on the at least one proximity detection signal; and
transmitting the physical channel by the UE in an entirety of a second subframe for communication with the wireless communication network,
wherein the physical channel comprises a physical uplink shared channel (PUSCH), the method further comprising:
obtaining at least one set of received symbols from at least one set of resource elements in the portion of the first subframe, one set of received symbols for each of the at least one proximity detection signal; and
demodulating and decoding the at least one set of received symbols to obtain information sent in the at least one proximity detection signal.

33. A method for wireless communication, comprising:
detecting, by a user equipment (UE), at least one proximity detection signal transmitted by at least one other UE in a portion of a first subframe, each proximity detection signal being generated based on a physical channel for a wireless communication network;
identifying the at least one other UE based on the at least one proximity detection signal; and
transmitting the physical channel by the UE in an entirety of a second subframe for communication with the wireless communication network,
wherein the physical channel comprises a physical uplink control channel (PUCCH), the method further comprising:
obtaining at least one set of received symbols from at least one set of resource elements in the portion of the first subframe, one set of received symbols for each of the at least one proximity detection signal;
despreading the at least one set of received symbols with at least one spreading sequence to obtain at least one set of despread symbols, one set of despread symbols for each of the at least one proximity detection signal; and
demodulating and decoding the at least one set of despread symbols to obtain information sent in the at least one proximity detection signal.

34. The method of claim 31, further comprising:
receiving control information from another UE in a remaining portion of the first subframe.

35. An apparatus for wireless communication, comprising:
means for detecting, by a user equipment (UE), at least one proximity detection signal transmitted by at least one other UE in a portion of a first subframe, each proximity detection signal being generated based on a physical channel for a wireless communication network;
means for identifying the at least one other UE based on the at least one proximity detection signal; and
means for transmitting the physical channel by the UE in an entirety of a second subframe for communication with the wireless communication network,
wherein the means for detecting at least one proximity detection signal is configured to detect the at least one proximity detection signal transmitted by the at least one other UE in all symbol periods of the first subframe except for a last symbol period of the first subframe.

36. The apparatus of claim 35, further comprising:
means for receiving control information from another UE in a remaining portion of the first subframe.

37. An apparatus for wireless communication, comprising:
at least one processor configured to detect, by a user equipment (UE), at least one proximity detection signal transmitted by at least one other UE in a portion of a first subframe, each proximity detection signal being generated based on a physical channel for a wireless communication network, to identify the at least one other UE based on the at least one proximity detection signal, and to send the physical channel by the UE in an entirety of a second subframe for communication with the wireless communication network,
wherein the at least one process configured to detect at least one proximity detection signal is configured to detect the at least one proximity detection signal transmitted by the at least one other UE in all symbol periods of the first subframe except for a last symbol period of the first subframe.

38. The apparatus of claim 37, wherein the at least one processor is configured to receive control information from another UE in a remaining portion of the first subframe.

39. A computer program product, comprising:
a non-transitory computer-readable medium comprising:
code for causing at least one processor to detect, by a user equipment (UE), at least one proximity detection signal transmitted by at least one other UE in a portion of a first subframe, each proximity detection signal being generated based on a physical channel for a wireless communication network,
code for causing the at least one processor to identify the at least one other UE based on the at least one proximity detection signal, and
code for causing the at least one processor to send the physical channel by the UE in an entirety of a second subframe for communication with the wireless communication network,
wherein the code for causing the at least one processor to detect at least one proximity detection signal is configured to detect the at least one proximity detection signal transmitted by the at least one other UE in all symbol periods of the first subframe except for a last symbol period of the first subframe.

40. A method for wireless communication, comprising:
sending a data transmission from a first user equipment (UE) to a second UE for peer-to-peer (P2P) communication;
receiving a signal comprising acknowledgement/negative acknowledgement (ACK/NACK) information sent by the second UE to the first UE for the data transmission for P2P communication, the signal being generated by the second UE based on a signal format not used for sending ACK/NACK information in a wireless communication network; and
processing the received signal by the first UE to obtain the ACK/NACK information sent by the second UE,
wherein the processing the received signal comprises:
correlating the received signal with a set of spreading sequences to obtain a set of correlation values, one correlation value for each of the set of spreading sequences, and
determining the ACK/NACK information based on the set of correlation values.

41. The method of claim 40, wherein the signal comprising the ACK/NACK information is generated based on a signal format for a sounding reference signal in the wireless communication network.

42. The method of claim 40, wherein the set of spreading sequences comprises a plurality of cyclic shifts of a base sequence, the base sequence comprising a Zadoff-Chu sequence or a computer-generated sequence.

43. A method for wireless communication, comprising:
sending a data transmission from a first user equipment (UE) to a second UE for peer-to-peer (P2P) communication;
receiving a signal comprising acknowledgement/negative acknowledgement (ACK/NACK) information sent by the second UE to the first UE for the data transmission for P2P communication, the signal being generated by the second UE based on a signal format not used for sending ACK/NACK information in a wireless communication network; and
processing the received signal by the first UE to obtain the ACK/NACK information sent by the second UE,
wherein the processing the received signal comprises:
correlating the received signal with a first spreading sequence for ACK to obtain a first correlation value,
correlating the received signal with a second spreading sequence for NACK to obtain a second correlation value, and
determining whether ACK or NACK was sent by the first UE based on the first and second correlation values.

44. The method of claim 43, wherein the determining whether ACK or NACK was sent comprises
determining a ratio based on the first and second correlation values,
declaring ACK was sent if the ratio is above a first threshold, and
declaring NACK was sent if the ratio is below a second threshold.

45. The method of claim 44, wherein the determining whether ACK or NACK was sent further comprises declaring no ACK or NACK was sent if the ratio is between the first and second thresholds.

46. The method of claim 40, wherein the receiving the signal comprises
receiving the signal comprising the ACK/NACK information in a single symbol period of a subframe.

47. An apparatus for wireless communication, comprising:
means for sending a data transmission from a first user equipment (UE) to a second UE for peer-to-peer (P2P) communication;
means for receiving a signal comprising acknowledgement/negative acknowledgement (ACK/NACK) information sent by the second UE to the first UE for the data transmission for P2P communication, the signal being generated by the second UE based on a signal format not used for sending ACK/NACK information in a wireless communication network; and
means for processing the received signal by the first UE to obtain the ACK/NACK information sent by the second UE,
wherein the means for processing the received signal comprises:
means for correlating the received signal with a set of spreading sequences to obtain a set of correlation values, one correlation value for each of the set of spreading sequences, and
means for determining the ACK/NACK information based on the set of correlation values.

48. An apparatus for wireless communication, comprising:
at least one processor configured to send a data transmission from a first user equipment (UE) to a second UE for peer-to-peer (P2P) communication, to receive a signal comprising acknowledgement/negative acknowledgement (ACK/NACK) information sent by the second UE to the first UE for the data transmission for P2P communication, the signal being generated by the second UE based on a signal format not used for sending ACK/NACK information in a wireless communication network, and to process the received signal by the first UE to obtain the ACK/NACK information sent by the second UE,
wherein the at least one processor is configured to correlate the received signal with a set of spreading sequences to obtain a set of correlation values, one correlation value for each of the set of spreading sequences, and to determine the ACK/NACK information based on the set of correlation values.

49. A computer program product, comprising:
a non-transitory computer-readable medium comprising:
code for causing at least one processor to send a data transmission from a first user equipment (UE) to a second UE for peer-to-peer (P2P) communication,
code for causing the at least one processor to receive a signal comprising acknowledgement/negative acknowledgement (ACK/NACK) information sent by the second UE to the first UE for the data transmission for P2P communication, the signal being generated by the second UE based on a signal format not used for sending ACK/NACK information in a wireless communication network, and
code for causing the at least one processor to process the received signal by the first UE to obtain the ACK/NACK information sent by the second UE,
wherein the code for causing the at least one processor to process the received signal is configured to correlate the received signal with a set of spreading sequences to obtain a set of correlation values, one correlation value for each of the set of spreading sequences, and to determine the ACK/NACK information based on the set of correlation values.

50. A method for wireless communication, comprising:
receiving a data transmission sent from a first user equipment (UE) to a second UE for peer-to-peer (P2P) communication;
determining acknowledgement/negative acknowledgement (ACK/NACK) information for the received data transmission;
generating a signal comprising the ACK/NACK information based on a signal format not used for sending ACK/NACK information in a wireless communication network; and
transmitting the signal comprising the ACK/NACK information from the second UE to the first UE,
wherein the generating the signal comprises:
selecting a spreading sequence in a set of spreading sequences based on the ACK/NACK information, wherein each of the set of spreading sequences is associated with a different possible value of the ACK/NACK information, and
generating the signal comprising the ACK/NACK information based on the selected spreading sequence.

51. The method of claim 50, wherein the generating the signal comprises
generating the signal comprising the ACK/NACK information based on a signal format for a sounding reference signal in the wireless communication network.

52. A method for wireless communication, comprising:
receiving a data transmission sent from a first user equipment (UE) to a second UE for peer-to-peer (P2P) communication;
determining acknowledgement/negative acknowledgement (ACK/NACK) information for the received data transmission;
generating a signal comprising the ACK/NACK information based on a signal format not used for sending ACK/NACK information in a wireless communication network; and
transmitting the signal comprising the ACK/NACK information from the second UE to the first UE,
wherein the generating the signal comprises:
determining a first spreading sequence for transmitting ACK and a second spreading sequence for transmitting NACK,
generating the signal based on the first spreading sequence if the ACK/NACK information comprises ACK, and
generating the signal based on the second spreading sequence if the ACK/NACK information comprises NACK.

53. A method for wireless communication, comprising:
receiving a data transmission sent from a first user equipment (UE) to a second UE for peer-to-peer (P2P) communication;
determining acknowledgement/negative acknowledgement (ACK/NACK) information for the received data transmission;
generating a signal comprising the ACK/NACK information based on a signal format not used for sending ACK/NACK information in a wireless communication network; and
transmitting the signal comprising the ACK/NACK information from the second UE to the first UE,
wherein the transmitting the signal comprises transmitting the signal comprising the ACK/NACK information in a single symbol period of a subframe.

54. An apparatus for wireless communication, comprising:
means for receiving a data transmission sent from a first user equipment (UE) to a second UE for peer-to-peer (P2P) communication;
means for determining acknowledgement/negative acknowledgement (ACK/NACK) information for the received data transmission;
means for generating a signal comprising the ACK/NACK information based on a signal format not used for sending ACK/NACK information in a wireless communication network; and
means for transmitting the signal comprising the ACK/NACK information from the second UE to the first UE,
wherein the means for generating the signal comprises:
means for selecting a spreading sequence in a set of spreading sequences based on the ACK/NACK information, wherein each of the set of spreading sequences is associated with a different possible value of the ACK/NACK information, and
means for generating the signal comprising the ACK/NACK information based on the selected spreading sequence.

55. An apparatus for wireless communication, comprising:
at least one processor configured to receive a data transmission sent from a first user equipment (UE) to a second UE for peer-to-peer (P2P) communication, to determine acknowledgement/negative acknowledgement (ACK/NACK) information for the received data transmission, to generate a signal comprising the ACK/NACK information based on a signal format not used for sending ACK/NACK information in a wireless communication network, and to send the signal comprising the ACK/NACK information from the second UE to the first UE,
wherein the at least one processor is configured to select a spreading sequence in a set of spreading sequences based on the ACK/NACK information, wherein each of the set of spreading sequences is associated with a different possible value of the ACK/NACK information, and to generate the signal comprising the ACK/NACK information based on the selected spreading sequence.

56. A computer program product, comprising:
a non-transitory computer-readable medium comprising:
code for causing at least one processor to receive a data transmission sent from a first user equipment (UE) to a second UE for peer-to-peer (P2P) communication,
code for causing the at least one processor to determine acknowledgement/negative acknowledgement (ACK/NACK) information for the received data transmission,
code for causing the at least one processor to generate a signal comprising the ACK/NACK information based on a signal format not used for sending ACK/NACK information in a wireless communication network, and
code for causing the at least one processor to send the signal comprising the ACK/NACK information from the second UE to the first UE,
wherein the code for causing the at least one processor to generate the signal is configured to select a spreading sequence in a set of spreading sequences based on the ACK/NACK information, wherein each of the set of spreading sequences is associated with a different possible value of the ACK/NACK information, and to generate the signal comprising the ACK/NACK information based on the selected spreading sequence.

* * * * *